US010631027B2

(12) United States Patent
Brondijk et al.

(10) Patent No.: US 10,631,027 B2
(45) Date of Patent: Apr. 21, 2020

(54) AUDIOVISUAL CONTENT ITEM DATA STREAMS

(71) Applicant: KONINKLIJKE PHILIPS N.V., Eindhoven (NL)

(72) Inventors: Robert Albertus Brondijk, Middelbeers (NL); Arnoldus Werner Johannes Oomen, Eindhoven (NL); Fransiscus Marinus Jozephus De Bont, Riethoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/160,166

(22) Filed: Oct. 15, 2018

(65) Prior Publication Data

US 2019/0052917 A1  Feb. 14, 2019

Related U.S. Application Data

(63) Continuation of application No. 15/121,391, filed as application No. PCT/EP2015/055380 on Mar. 16, 2015, now Pat. No. 10,142,666.

(Continued)

(30) Foreign Application Priority Data

Mar. 18, 2014  (EP) .................................... 14160403

(51) Int. Cl.
*H04N 7/173* (2011.01)
*H04N 21/2362* (2011.01)

(Continued)

(52) U.S. Cl.
CPC ....... *H04N 21/2362* (2013.01); *H04N 21/233* (2013.01); *H04N 21/234* (2013.01);

(Continued)

(58) Field of Classification Search
None
See application file for complete search history.

(56) References Cited

U.S. PATENT DOCUMENTS 5,420,866 A    5/1995  Wasilewski
2002/0051119 A1  5/2002  Sherman (Continued)

OTHER PUBLICATIONS

European Standard, ETSI, EN 300 468, DVB, "Digital Video Braodcasating, Specification for Service Information (SI) in DVB Systems" XP017843691, 2014, pp. 1-192.

(Continued)

*Primary Examiner* — William J Kim

(57) ABSTRACT

A transmitting apparatus generates an audiovisual content item data stream (e.g. transport stream) comprising a plurality of individual audiovisual data streams with audiovisual components for the content item. A generator (301-307) generates a first stream comprising both mandatory audio data and replaceable audio data for the audio representation where the replaceable audio data being data can be replaced by alternative audio data. A combiner (309) includes the resulting stream into the content item data stream. A receiving apparatus includes an extractor (403) which extracts the mandatory audio data from the received stream. A replacer (415) may replace the replaceable audio data by alternative audio data and an output (415) can generate an audio signal from the mandatory and alternative audio data. The approach may specifically provide an improved and more flexible data stream for audiovisual content.

20 Claims, 15 Drawing Sheets

Related U.S. Application Data

(60) Provisional application No. 62/018,801, filed on Jun. 30, 2014.

(51) Int. Cl.

| | |
|---|---|
| *H04N 21/485* | (2011.01) |
| *H04N 21/81* | (2011.01) |
| *H04N 21/233* | (2011.01) |
| *H04N 21/234* | (2011.01) |
| *H04N 21/235* | (2011.01) |
| *H04N 21/242* | (2011.01) |
| *H04N 21/84* | (2011.01) |
| *H04N 21/854* | (2011.01) |

(52) U.S. Cl.
CPC ......... *H04N 21/235* (2013.01); *H04N 21/242* (2013.01); *H04N 21/4856* (2013.01); *H04N 21/8106* (2013.01); *H04N 21/84* (2013.01); *H04N 21/85403* (2013.01)

(56) References Cited

U.S. PATENT DOCUMENTS

| | | | |
|---|---|---|---|
| 2005/0042591 A1 | 2/2005 | Bloom | |
| 2006/0106597 A1 | 5/2006 | Stein | |
| 2006/0130121 A1* | 6/2006 | Candelore | G11B 27/034 |
| | | | 725/145 |
| 2008/0209482 A1 | 8/2008 | Meek | |
| 2008/0215172 A1* | 9/2008 | Digon | G11B 27/034 |
| | | | 700/94 |
| 2009/0150230 A1* | 6/2009 | Verhaegh | G06Q 30/0242 |
| | | | 705/14.41 |
| 2010/0161825 A1* | 6/2010 | Ronca | H04N 21/23424 |
| | | | 709/231 |
| 2011/0196981 A1* | 8/2011 | Li | H04L 65/607 |
| | | | 709/231 |
| 2011/0307545 A1* | 12/2011 | Bouazizi | H04N 21/234345 |
| | | | 709/203 |
| 2012/0254457 A1* | 10/2012 | Condon | H04N 21/23439 |
| | | | 709/231 |
| 2013/0262694 A1* | 10/2013 | Swaminathan | H04L 65/4084 |
| | | | 709/231 |

OTHER PUBLICATIONS

Hellmuth et al, "MPEG Spatial Audio Object Coding, The ISO/MPEG Standard for Efficient Coding of Interactive Audio Scenes", AES Convention 129, Convention Opaper 8264, 2010, XP040567234, pp. 1-19.

Steffens et al, "Interactivity in MPEG-H 3D Audio Content—Proposal for Extension of OAM Format and Test Psrocedure", Coding of Motion Picture Expert Group, No. M28130, 2013, XP030056683, pp. 1-3.

Schreiner et al, "On Multiple MPEG-H 3D Audio Streams", Coding of Motion Picture Expert Group No. M34266, 2014, XP030062639, pp. 1-6.

ETSI TS 101 154, "Digital Video Broadcasting (DVB); Specification for the use of Video and Audio Coding in Broadcasting Applications based on the MPEG-2 Transport Stream", 2012.

\* cited by examiner

| Syntax | Number of bits | Identifier |
|---|---|---|
| supplementary_audio_descriptor () { | | |
|    descriptor_tag | 8 | uimbsf |
|    descriptor_length | 8 | uimbsf |
|    descriptor_tag_extension | 8 | uimbsf |
|    mix_type | 1 | uimbsf |
|    editional_classification | 5 | uimbsf |
|    reserved | 1 | uimbsf |
|    language_code_present | 1 | uimbsf |
|    if (language_code_present == 1) { | | |
|       ISO_639_laguage_code | 24 | bslbf |
|    } | | |
|    for (i=0; i<N; i++) { | | |
|       private_data_byte | 8 | uimbsf |
|    } | | |
| } | | |

FIG. 7

| editorial_classification | Description |
| --- | --- |
| 0x00 | Main audio (contains all of the main audio components and can be presented on its own or mixed with a supplementary audio stream). This classification shall not be used for broadcast-mix audio (see clause J.3) e.g. audio streams that are premixed with visual impaired or hearing impaired audio. |
| 0x01 | Audio description for the visually impaired (contains a spoken description of the visual content of the service). |
| 0x02 | Clean audio for the hearing impaired. |
| 0x03 | Spoken subtitles for the visutly impaired. |
| 0x04 to 0x16 | Reserved for future use. |
| 0x17 | Unspecific supplementary audio for the general audience. |
| 0x18 to 0x1F | User defined. |

NOTE: Restrictions on valid combinations of audio_type, mix_type, and editorial_classification are given in clause J.4.

| mix_type | Description |
| --- | --- |
| 0 | Audio stream is a dependent stream and is intended to be mixed with a separate complete and independent audio stream by the receiver. |
| 1 | Audio stream is a complete and independet stream. |

NOTE: Restrictions on valid combinations of audio_type, mix_type, and editorial_classification are given in annex J.4.

FIG. 8

| Mixtype | Object | |
|---|---|---|
| 1 | 0 | Complete and independent and may be mixed with either 00b or 01b. |
| 1 | 1 | Background to be mixed with mixobject 01b and may additionally be mixed with mix 00b for audio description. |
| 0 | 0 | Mix stream, must be mixed with 11b. Mixing with 10b implies that it contains object audio components. |
| 0 | 1 | Mix object, to be mixed with background 11b or main 10b. |

FIG. 9

| editorial_classification | Description |
|---|---|
| 0x00 | Main audio (contains all of the main audio components and can be presented on its own or mixed with a supplementary audio stream). This classification shall not be used for broadcast-mix audio (see clause J.3) e.g. audio streams that are premixed with visual impaired or hearing impaired audio. |
| 0x01 | Audio description for the visually impaired (contains a spoken description of the visual content of the service). |
| 0x02 | Clean audio for the hearing impaired. |
| 0x03 | Spoken subtitles for the visually impaired. |
| 0x04 to 0x16 | Reserved for future use. |
| 0x17 | Unspecific supplementary audio for the general audience. |
| 0x18 | This main audio, as 0x00, and contains a replaceable languages objects. |
| 0x18 to 0x1F | User defined. |
| NOTE: | Restrictions on valid combinations of audio_type, mix_type, and editorial_classification are given in clause J.4. |

FIG. 10

| Syntax | Number of bits | Identifier |
|---|---|---|
| AAC_descriptor () { | | |
|     descriptor_tag | 8 | uimsbf |
|     descriptor_length | 8 | uimsbf |
|     profile_and_level | 8 | uimsbf |
|     if (descriptor_length > 1) { | | |
|         AAC_type_flag | 1 | bslbf |
|         AAC_objects_flag | 1 | bslbf |
|         reserved | 6 | bslbf |
|         if (AAC_type_flag == 1) { | | |
|             AAC_type | 8 | uimsbf |
|         } | | |
|         if (AAC_objects_flag == 1) { | | |
|         nr_objects | 8 | uimsbf |
|         for (i=0; i<nr_objects; i++) { | | |
|             descriptor () | | |
|         } | | |
|     } | | |
|     for (i=0;i<N; i++) { | | |
|         additional_info_byte | 8 | uimsbf |
|     } | | |
|     } | | |
| } | | |

FIG. 11

| Syntax | Number of bits | Mnemonic |
|---|---|---|
| ObjectMetadataConfig() | | |
| { | | |
|     lowDelayMetadataCoding; | 1 | bslbf |
|     hasCoreLength; | 1 | bslbf |
|     if (!hasCoreLength) { | | |
|         frameLength; | 6 | uimsbf |
|     } | | |
|     object_identifier | 8 | uimsbf |
|     for (i=0; i<n; i++) { | | |
|         Object_Descriptor() | | |
|     } | | |
| } | | |

FIG. 12

| Syntax | Number of bits | Mnemonic |
|---|---|---|
| ObjectDescriptor() | | |
| { | | |
| descriptorTag | 8 | uimsbf |
| descriptorLength | 8 | uimsbf |
| for (i=0;<n; i++){ | | |
| data | 8 | |
| } | | |
| } | | |

| Syntax object descriptor | Number of bits | Mnemonic |
|---|---|---|
| SharedSAOC() | | |
| { | | |
| descriptorTag | 8 | uimsbf |
| descriptorLength | 8 | uimsbf |
| objectnumInElementIndx | 8 | uimsbf |
| objectInSaoc | 5 | uimsbf |
| reserved | 3 | uimsbf |
| } | | |

AUDIOVISUAL CONTENT ITEM DATA STREAMS

CROSS-REFERENCE TO PRIOR APPLICATIONS

This application is a Continuation of application Ser. No. 15/121,391, filed Aug. 25, 2016, which is the U.S. National Phase application under 35 U.S.C. § 371 of International Application No. PCT/EP2015/055380, filed on Mar. 16, 2015, which claims the benefit of U.S. Provisional Application No. 62/018,801, filed on Jun. 30, 2014 and European Patent Application No. 14160403.3, filed Mar. 18, 2014. These applications are hereby incorporated by reference herein.

FIELD OF THE INVENTION

The invention relates to audiovisual content item data streams and in particular, but not exclusively, to audiovisual content item data streams such as the MPEG-2 Transport Stream.

BACKGROUND OF THE INVENTION

Digital encoding of various source signals has become increasingly important over the last decades as digital signal representation and communication increasingly has replaced analogue representation and communication. For example, mobile telephone systems, such as the Global System for Mobile communication, are based on digital speech encoding. Also distribution of media content, such as video and music, is increasingly based on digital content encoding.

Typically, an audiovisual content item comprises a number of different audiovisual components and types of data. For example, a content item corresponding to a movie or television program may include at least one video signal component, typically a plurality of different audio components, control data, synchronization data, meta-data e.g. characterizing the content etc. For example, a movie may include a main video component, a secondary video component, a plurality of audio tracks (e.g. for different languages), subtitle data, metadata identifying e.g. movie title, main actors etc. Thus, often a relatively large number of different data types need to be included into a single combined data stream for the audiovisual content item.

In order to accommodate a representation of an audiovisual content item which includes a range of different types data, an audiovisual content item data stream may often be generated that comprises a plurality of (sub) audiovisual data streams providing audiovisual components for the audiovisual content item. In addition, data streams may be included comprising control data, meta-data etc.

The audiovisual content item data stream can comprise all data related to rendering of the content item. The audiovisual content item data stream is typically referred to as a transport stream, or possibly as a system stream, program stream or container stream. The individual audiovisual data stream is typically referred to as an elementary data stream.

In order to provide an efficient representation of the audiovisual content item, it is important that an effective data structure is defined for the audiovisual content item data stream. The use of a data structure comprising a number of separate audiovisual data streams which each represent audiovisual components provide for a flexible yet efficient approach. The approach for example allows a flexible inclusion of different audio tracks for a given video component, e.g. audio signals corresponding to different languages may be provided in different audiovisual data streams.

A number of different structures for audiovisual content item data streams have been standardized. One of the most widespread and frequently used structures for audiovisual content item data streams is the MPEG-2 Transport Stream which is used for example for digital television broadcast or Blu-rays.

The MPEG-2 Transport Stream is an example of a data structure wherein the data stream is made up of a plurality of sequential time multiplexed data packets. Each data packet may provide data for a specific component of the audiovisual content item.

However, a problem with the conventional approach for audiovisual content item data streams is that the data structure is suboptimal for some purposes, and in particular tends to not provide optimal flexibility.

For example, audiovisual content item data streams such as the MPEG-2 Transport Stream do support alternative audio representations for a given scene by allowing for different audio representations to be provided in different elementary streams. A receiver may then select between these alternative elementary streams to provide a desired audio track. E.g., an MPEG-2 Transport Stream may comprise an elementary stream comprising a video component along with two elementary streams that each provides an audio representation that can be rendered together with the video component. For example, one elementary audio stream may comprise the audio of the video component in the original language while another elementary audio stream may comprise the audio for the video component but with the speech dubbed in a different language. A decoder or renderer may then select between the alternative audio tracks for the video by selecting the appropriate elementary stream.

However, such an approach does not provide optimum flexibility for the audio, and also results in a relatively high data rate due to the parallel audio representations provided by the alternative elementary streams.

It would accordingly be desirable to provide an improved approach for audiovisual content item data streams, and in particular an approach which provides additional flexibility and/or a reduced data rate would be desirable.

However, a critical challenge is that of how such an enhancement is possible while keeping a high degree of commonality with existing approaches. For example, it is desirable to be able to further enhance the MPEG-2 Transport Stream, but such enhancement should preferably maintain as much backwards compatibility as possible. The considerations required for enhancing approaches for audiovisual content item data streams may furthermore not just be limited to which additional data should be provided, how or in which format. Rather, additional challenges exist in determining how such data should be included in an audiovisual content item data stream to not only achieve an efficient audiovisual content item data stream but also allow for an efficient operation and preferably optimized backwards compatibility.

Hence, an improved approach for audiovisual content item data streams would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of generating an audiovisual content item data stream comprising a plurality of individual audiovisual data streams, the plurality of individual audiovisual data streams comprising audiovisual components for an audiovisual content item; each audiovisual data stream comprising encoded data representing at least one audiovisual component and synchronization data;

the method comprising: generating a first audiovisual data stream comprising first audio data for an audio representation for the audiovisual content item, the first audio data comprising mandatory audio data for the audio representation and replaceable audio data for the audio representation, the replaceable audio data being data replaceable by alternative audio data; and including the first audiovisual data stream in the audiovisual content item data stream.

The invention may provide an improved audiovisual content item data stream. In particular, a transport stream with increased flexibility and/or reduced data rate may be achieved in many scenarios.

A more efficient provision of alternative audio can be achieved in many scenarios. The approach may typically be implemented as an enhancement to, or further development of existing transport streams while requiring a relatively low level of modification. Increased backwards compatibility can often be achieved.

As a specific example, the approach may allow an efficient and practical enhancement of transport streams such as the MPEG-2 Transport Stream. The transport stream may maintain the approach and overall design philosophy of traditional MPEG-2 Transport Streams while allowing this to be enhanced to provide a more flexible and efficient representation of alternative audio representations.

The replaceable audio data can be replaced by/substituted by/exchanged for/changed to the alternative audio data. Thus, the transport stream provides alternative audio representations for the content item with one alternative e.g. being a default representation represented by the mandatory audio data and the replaceable audio data, and the other being an alternative representation represented by the mandatory audio data and the alternative audio data.

In many scenarios, the method may further comprise including the alternative audio data in the transport stream, often in the first audiovisual data stream or in another audiovisual content item data stream of the plurality of audiovisual data streams. Thus, the alternative audio data may be comprised in an audiovisual data stream of the plurality of individual audiovisual data streams.

The mandatory audio data may define a mandatory audio component for the audio representation. The replaceable audio data may define a replaceable audio component for the audio representation. The alternative audio data may define an alternative audio component for the audio representation.

Thus, the first audio data may comprise mandatory audio data for a mandatory audio component of the representation and replaceable audio data for a replaceable audio component for the representation, the replaceable audio component being data which may be substituted by alternative audio data for an alternative audio component to the replaceable audio component.

The replaceable audio data may correspond to a default audio track for the content item.

The transport stream may include a designation of one or more audio representations for the content item. An audio representation may correspond to a set of audio components which is sufficient for providing an audio output for the content item. The transport stream may accordingly designate at least one audio sound track/representation for the content item. In many embodiments, at least one audio representation designated (or defined) in the transport stream comprises a plurality of audio components wherein at least one audio component is a mandatory audio component and at least one audio component is a replaceable audio component. The mandatory audio component is represented by mandatory audio data and the replaceable audio component is represented by replaceable audio data. The mandatory audio component must be included in the audio output for the content item when the representation is selected. However, when a receiver selects this representation, the replaceable audio component may be included or may be substituted by an alternative audio component. The alternative audio component is represented by alternative audio data, often (but not always/necessarily) comprised in the transport stream itself.

In the approach, audio data for an audio representation defined/specified/described/designated in the transport stream may accordingly comprise mandatory audio data for at least one mandatory audio component and replaceable audio data for at least one replaceable audio component. When the transport stream designated audio representation is selected for e.g. rendering, the mandatory audio component must be included whereas the replaceable audio component must be included or replaced by an alternative audio component.

An audio representation for a content item may correspond to a set of audio components sufficient for providing an audio presentation/track for the content item. Specifically, an audio representation for a content item may correspond to a set of audio components that are indicated in the transport stream to be sufficient to provide a sound track for the content item. A set of audio components that are not defined in the transport stream to be sufficient to provide an audio representation for the content item unless combined with at least one other audio component does not form an audio representation.

Thus, the transport stream may include data defining one or more audio representations for the content item. The mandatory audio data may be mandatory for a first audio representation of the defined audio representations. The replaceable audio data provides audio data required for the first audio representation unless replaced by the alternative audio data. The transport stream may possibly designate more than one audio representation for the content item. In this case the mandatory audio data need not be mandatory for a second audio representation.

A data stream may e.g. correspond to a separate file or a segment of a file.

In accordance with an optional feature of the invention, the method further comprises the step of including the alternative audio data in the first audiovisual data stream.

This may provide an efficient and flexible approach and audiovisual content item data stream. In particular, in many scenarios, it may provide a very efficient data structure for alternative audio. The approach may for example provide an improved grouping of alternative audio which may in some embodiments facilitate operation.

In accordance with an optional feature of the invention, the step of including the alternative audio data in the first audiovisual data stream comprises including the alternative audio data in a different audiovisual data stream of the plurality of individual audiovisual data streams than the first audiovisual data stream.

This may provide an efficient and flexible approach, and an efficient and flexible audiovisual content item data stream. In particular, it may in many scenarios provide a very efficient data structure for alternative audio. The approach may for example facilitate the generation of the transport stream and/or facilitate extraction of desired data therefrom.

In some embodiments, the different audiovisual data stream may provide an alternative audio representation of the audio scene. For example, the different audiovisual data stream may be designated in the transport stream as an elementary stream that provides an audio representation for a content item. Specifically, it may comprise data for a set of audio components sufficient for generating an audio output for the content item without including any audio components for other streams.

The audiovisual content item data stream may be a transport stream and the first audiovisual data stream may be an elementary stream.

The approach may provide an improved transport stream which is based on a number of individual elementary streams. The approach may provide a flexible, yet efficient structure for representing a content item. Furthermore, it may allow improved backwards compatibility with conventional systems.

In accordance with an optional feature of the invention, the replaceable audio data represents a speech audio component in a first language and the alternative audio data represents a speech audio component in a second language.

The approach may provide a particularly efficient approach for providing a plurality of different/alternative languages for a given content item.

In accordance with an optional feature of the invention, the mandatory audio data represents a background audio component and the replaceable audio data represents a speech audio component.

The approach may provide a particularly efficient approach for providing differentiated sound for background audio and speech audio, and in particular may facilitate the support of alternative speech components without unacceptably increasing the data rate.

In accordance with an optional feature of the invention, the replaceable audio data and the alternative audio data represents the same an audio content encoded using different encoding characteristics.

The different encoding characteristics may for example be different data rates, different encoding algorithms etc. Specifically, in some embodiments, the replaceable audio data and the alternative audio data may represent a same audio content or component encoded with different encoding characteristics, such as different bit rates.

The approach may allow increased flexibility, and may specifically allow a flexible adaptation of characteristics of a transport stream. Furthermore, the approach may allow the transport stream to relatively easily be modified by e.g. intermediate systems or entities.

The alternative audio data may for example represent an audio object which may include further sub-objects.

In accordance with an optional feature of the invention, the method further comprises the step of including rendering control data in the audiovisual content item data stream, the rendering control data providing a different rendering parameter for a rendering using the replaceable audio data than a rendering using the alternative audio data.

This may provide advantageous functionality and/or improved rendering of the audio for the content item.

The method may specifically comprise the step of including rendering control data in the audiovisual content item data stream, the rendering control data being indicative of a different rendering setting for a rendering of the replaceable audio data than for a rendering of the alternative audio data.

In accordance with an optional feature of the invention, the method further comprises the step of including an indication in the audiovisual content item data stream of the first audiovisual data stream comprising replaceable audio data.

This may allow an efficient adaptation of the functionality of a receiver processing the audiovisual content item data stream.

In accordance with an optional feature of the invention, the method further comprises the step of including extraction data for the replaceable audio data in the audiovisual content item data stream.

This may allow an efficient adaptation of the functionality of a receiver processing the audiovisual content item data stream.

In accordance with an optional feature of the invention, the method further comprises the steps of: generating a content item map table, the content item map table for a content item comprising a list of audiovisual data stream packet identifiers for data packets for audiovisual data streams linked to the content item; and including the content item map table in the audiovisual content item data stream; wherein the step of generating the content item map table comprises generating the content item map table to include a common data stream packet identifier for the content item for a set of at least two of the plurality of individual audiovisual data streams.

This may provide improved and/or facilitated operation in many embodiments. Specifically, it may allow an audiovisual content item data stream to be generated which may be processed with reduced complexity by different equipment, such as multiplexers, data extractors etc.

In accordance with an optional feature of the invention, the step of generating the content item map table comprises including only one audiovisual data stream packet identifier for the content item in the content item map table.

This may provide improved and/or facilitated operation in many embodiments. In particular, it may allow various functionality to process the audiovisual content item data stream as if it only included a single audio visual data stream.

In some embodiments, the step of generating the content item map table comprises including only one audio audiovisual data stream packet identifier for the content item in the content item map table.

This may provide improved and/or facilitated operation in many embodiments. In particular, it may allow various functionality to process the audiovisual content item data stream as if it only included a single audio audiovisual data stream.

In accordance with an optional feature of the invention, the step of generating the content item map table comprises for the common data stream packet identifier including a plurality of secondary packet identifiers, each secondary packet identifier identifying an individual audiovisual data stream of the set of at least two of the plurality of individual audiovisual data streams.

This may provide improved flexibility and functionality. For example, it may allow an efficient selection and access to individual audio visual data streams. The primary and secondary packet identifiers may in some embodiments be included in a structured or nested data structure or may in other embodiments e.g. be provided in a flat structure, where e.g. primary and secondary packet identifiers are provided as sequential entries in a single list.

In accordance with an optional feature of the invention, the method further comprises the steps of: generating an audio data processing descriptor for second audio data of at least one of the audiovisual data streams, the audio data processing descriptor being indicative of whether the second audio data is designated alternative audio data or additional audio data; and including the content item map table in the audiovisual content item data stream.

This may provide improved functionality and may in particular allow an efficient way of indicating how different audio data may be processed by a decoder.

In accordance with an optional feature of the invention, the method further comprises the step of generating a content item map table, the content item map table for a content item comprising a list of audiovisual data stream packet identifiers for data packets for audiovisual data streams linked to the content item; and wherein the step of generating the content item map table comprises generating the content item map table to include the audio data processing descriptor.

This may provide particularly advantageous representation of the information in many embodiments.

In accordance with another aspect of the invention, there is provided a method of generating an audio signal for an audiovisual content item, the method comprising: receiving an audiovisual content item data stream comprising a plurality of individual audiovisual data streams, the plurality of individual audiovisual data streams comprising audiovisual components for an audiovisual content item; each audiovisual data stream comprising encoded data representing at least one audiovisual component and synchronization data; wherein the audiovisual content item data stream comprises a first audiovisual data stream comprising first audio data for an audio representation for the audiovisual content item, the first audio data comprising mandatory audio data for the audio representation and replaceable audio data for the representation; the method further comprising: extracting the mandatory audio data from the first audio data; retrieving alternative audio data; replacing the replaceable audio data by the alternative audio data; generating the audio signal from the mandatory audio data and the alternative audio data.

The invention may allow improved generation of audio for a content item. Typically, a more efficient and/or flexible processing, communication or functionality can be achieved.

A more efficient selection and generation audio can be achieved in many scenarios.

The approach may often provide improved backwards compatibility. It will be appreciated that the comments previously provided with respect to the generation of the audiovisual content item data stream will equally apply, mutatis mutandis, to the processing of the audiovisual content item data stream.

The replacing of the replaceable audio data by the alternative audio data may be by a selection of the alternative audio data and a de-selection (or non-selection) of the replaceable audio data for processing. In some embodiments, the selection/de-selection may be a selection/de-selection of audio components corresponding to the replaceable audio data and alternative audio data, i.e. by a selection/de-selection of a replaceable audio component and an alternative audio component generated by decoding the replaceable audio data and alternative audio data respectively. In other embodiments, the replacing may e.g. be, by overwriting the replaceable audio data by the alternative audio data, e.g. in a data stream/bitstream or in memory.

In some embodiments, the method may comprise retrieving only one of the replaceable audio data and the alternative audio data, and using only the retrieved audio data for generating the audio signal.

In some embodiments, the retrieving comprises retrieving the alternative audio data from the first audiovisual data stream. In some embodiments, the retrieving comprises retrieving the alternative audio data from a different audiovisual data stream of the plurality of individual audiovisual data streams than the first audiovisual data stream.

In some embodiments, the retrieving comprises retrieving the alternative audio data from a different data stream than the audiovisual content item data stream.

A data stream may e.g. correspond to a separate file or a segment of a file.

In accordance with an optional feature of the invention, the method further comprises receiving a second audiovisual content item data stream comprising a plurality of audiovisual data streams, the plurality of audiovisual data streams comprising audiovisual components; and wherein the retrieving comprises retrieving the alternative audio data from an audiovisual data stream of the second audiovisual content item data stream.

This may provide advantageous functionality and/or operation in many embodiments.

In accordance with an optional feature of the invention, the step of generating the audio signal comprises: decoding the mandatory audio data in a first audio decoder to generate a first decoded audio signal; decoding the alternative audio data in a second audio decoder to generate a second decoded audio signal; and generating the audio signal in response to combining at least the first decoded audio signal and the second decoded audio signal.

This may provide improved and/or facilitated operation in many embodiments.

In accordance with an optional feature of the invention, the audiovisual content item data stream comprises a content item map table, the content item map table for a content item comprising a list of audiovisual data stream packet identifiers for data packets for audiovisual data streams linked to the content item, the content item map table comprising a common data stream packet identifier for the content item for a set of at least two of the plurality of individual audiovisual data streams; and the method further comprises the step of extracting audio data for the content item in response to the common data stream packet identifier.

This may provide improved and/or facilitated operation in many embodiments. Specifically, it may allow an audiovisual content item data stream to be generated which may be processed with reduced complexity by different equipment, such as multiplexers, data extractors etc.

In accordance with an optional feature of the invention, the content item map table comprises a plurality of secondary packet identifiers for the common data stream packet identifier, each secondary packet identifier identifying an individual audiovisual data stream of the set of at least two of the plurality of individual audiovisual data streams; and the step of extracting audio data for the content item comprises extracting audio data for different audio components in response to the secondary packet identifiers.

This may provide improved flexibility and functionality. For example, it may allow an efficient selection and access to individual audio visual data streams. The primary and secondary packet identifiers may in some embodiments be included in a structured or nested data structure or may in other embodiments e.g. be provided in a flat structure, where e.g. primary and secondary packet identifiers are provided as sequential entries in a single list.

According to an aspect of the invention there is provided an apparatus for generating an audiovisual content item data stream comprising a plurality of individual audiovisual data streams, the plurality of individual audiovisual data streams comprising audiovisual components for an audiovisual content item; each audiovisual data stream comprising encoded data representing at least one audiovisual component and synchronization data;

the apparatus comprising: a generator for generating a first audiovisual data stream comprising first audio data for an audio representation for the audiovisual content item, the first audio data comprising mandatory audio data for the audio representation and replaceable audio data for the audio representation, the replaceable audio data being data replaceable by alternative audio data; and a combiner for including the first audiovisual data stream in the audiovisual content item data stream.

According to an aspect of the invention there is provided an apparatus for generating an audio signal for an audiovisual content item, the apparatus comprising: a receiver for receiving an audiovisual content item data stream comprising a plurality of individual audiovisual data streams, the plurality of individual audiovisual data streams comprising audiovisual components for an audiovisual content item; each audiovisual data stream comprising encoded data representing at least one audiovisual component and synchronization data; wherein the audiovisual content item data stream comprises a first audiovisual data stream comprising first audio data for an audio representation for the audiovisual content item, the first audio data comprising mandatory audio data for the audio representation and replaceable audio data for the audio representation;

the apparatus further comprising: an extractor for extracting the mandatory audio data from the first audio data; a retriever retrieving alternative audio data; a replacer for replacing the replaceable audio data by the alternative audio data; an output for generating the audio signal from the mandatory audio data and the alternative audio data.

In accordance with an optional feature of the invention, the audio data processing descriptor is indicative of whether the second audio data replaces the replaceable data.

This may provide a particularly advantageous and efficient implementation in many embodiments while allowing a high degree of flexibility and control in the processing of audio data of an audiovisual content item data stream.

The approach may in particular provide an efficient interface between a receiver and an audio decoder. In many embodiments and scenarios, it may allow generic audio decoders to be used while providing flexibility in audio rendering and without requiring complex and/or proprietary control functions to be implemented between the receiver and the audio decoder.

In accordance with an optional feature of the invention, the audio data processing descriptor is indicative of whether the second audio data replaces the replaceable data.

This may provide a particularly advantageous and efficient implementation in many embodiments while allowing a high degree of flexibility and control in the processing of audio data of an audiovisual content item data stream.

In accordance with an optional feature of the invention, the audio data processing descriptor is indicative of whether the second audio data is designated alternative audio data or additional audio data, and the audio decoder (1403) is arranged to retrieve the second audio data as alternative audio data if the first audio data processing descriptor indicates that the second audio data is designated as alternative audio data and to retrieve the second audio data as additional audio data if the first audio data processing descriptor indicates that the second audio data is designated as additional audio data; and to replace the replaceable audio data by the second audio data if the second audio data is designated as replaceable audio data, and the output is arranged to generate the audio signal by combining the mandatory audio data, the second audio data, and the replaceable audio data if the first audio data processing descriptor indicates that the second audio data is designated as additional audio data.

This may provide a particularly advantageous and efficient approach for controlling the adaptation of the audio rendering.

In accordance with an optional feature of the invention, the receiver (1401) is arranged to generate the first audio data processing descriptor from a second audio data processing descriptor received in the audiovisual content item data stream.

This may allow both the provider of the audiovisual content item data stream and the local renderer or user to control the generated audio. The second audio data processing descriptor may describe appropriate audio output that may be used by e.g. the user in determining a suitable rendering.

The approach may also facilitate implementation. For example, the receiver need not have any detailed knowledge or consideration of how the specific audio processing is performed but rather may simply base the first audio data processing descriptor on the second audio data processing descriptor.

In accordance with an optional feature of the invention, the receiver (1401) is arranged to copy the second audio data processing descriptor to the second audiovisual data stream.

The approach may also facilitate implementation. For example, the receiver need not have any detailed knowledge or consideration of how the specific audio processing is performed but rather may simply copy the second audio data processing descriptor.

In accordance with an optional feature of the invention, the second audio data processing descriptor is comprised in a content item map table, the content item map table for a content item comprising a list of audiovisual data stream packet identifiers of data packets for audiovisual data streams linked to the content item.

This may provide a particularly advantageous representation.

In accordance with an optional feature of the invention, the audiovisual content item data stream comprises a plurality of possible audio data processing descriptors for the second audio data; and the receiver is arranged to select the first audio data processing descriptor from the plurality of possible audio data processing descriptors.

This may allow both the provider of the audiovisual content item data stream and the local renderer or user to control the generated audio. The second audio data processing descriptor may for example describe allowable or recommended combinations of the provided audio components, thereby providing alternative audio presentations for the content item. A user may simply select one suggested alternative audio presentation, and the receiver may in response cause the selected audio presentation to be provided simply by copying the corresponding second audio data processing descriptor and including it in the data stream provided to the audio decoder.

According to an aspect of the invention there is provided an audiovisual content item data stream comprising a plurality of individual audiovisual data streams, the plurality of individual audiovisual data streams comprising audiovisual components for an audiovisual content item; each audiovisual data stream comprising encoded data representing at least one audiovisual component and synchronization data; wherein the audiovisual content item data stream comprises a first audiovisual data stream comprising first audio data for an audio representation for the audiovisual content item, the first audio data comprising mandatory audio data for the audio representation and replaceable audio data for the audio representation.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 7 illustrates the syntax of a supplementary audio descriptor of an MPEG-2 Transport Stream;

FIG. 8 illustrates the syntax of the data items mix_type and editorial_classification of an MPEG-2 Transport Stream;

FIG. 9 illustrates a modified syntax of a mix_type data item in accordance with some embodiments of the invention;

FIG. 10 illustrates a modified syntax of an editorial_classification data item in accordance with some embodiments of the invention;

FIG. 11 illustrates a syntax of a AAC descriptor component data item in accordance with some embodiments of the invention;

FIG. 12 illustrates an identification of an object in an audio payload header;

DETAILED DESCRIPTION OF SOME EMBODIMENTS OF THE INVENTION

The following description focuses on embodiments of the invention applicable to enhancement of transport streams for audiovisual content, such as e.g. an MPEG-2 Transport Stream. However, it will be appreciated that the invention is not limited to this application but may be applied to many other audiovisual content item data streams.

Figure 1:
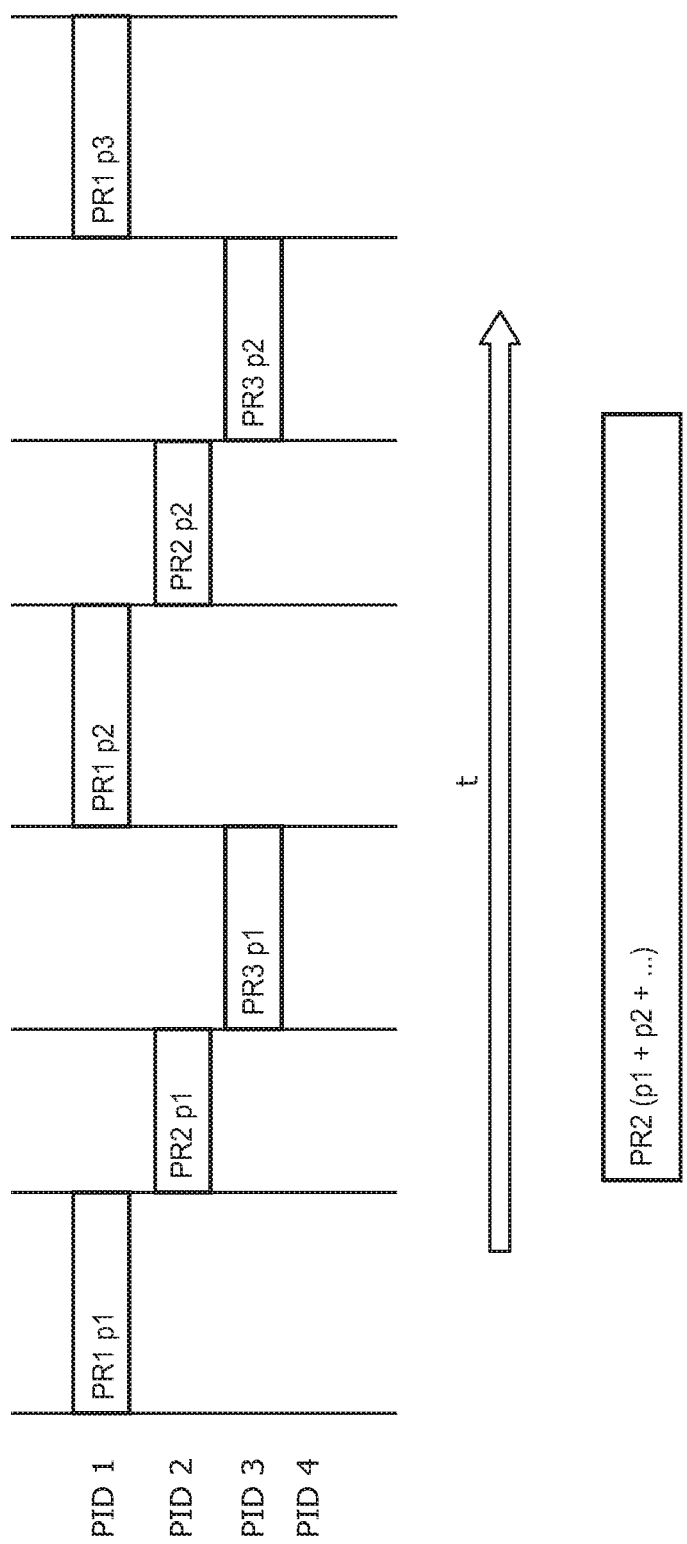
FIG. 1 is an illustration of a transport stream in accordance with prior art.

As a specific reference, an example of an MPEG DVB (Digital Video Broadcast) Transport Stream (TS), as defined in ISO/IEC 13818-1 extended with standard DVB content as in EN 300468 is illustrated in FIG. 1. It will be appreciated that although the description will focus on embodiments that may e.g. enhance such an audiovisual content item data stream, the approach may be applied to many other transport technologies, including for example transport streams based on TCP/IP in the context of ISO/IEC 23009-1 DASH (Dynamic Adaptive Streaming over HTTP).

In the example, a transport stream is made up of a plurality of data packets. The data of the transport stream is divided into a plurality of elementary streams corresponding to an audiovisual component, control, or information data (metadata). Each of the elementary streams is associated with a given identity and each packet comprises a header that includes a Packet IDentifier (PID) which identifies the elementary stream for which the packet comprises data.

In the specific example, the transport stream is a time multiplexed stream of packets with each packet containing 188 bytes. Each packet is labeled by a PID. A packet may contain meta-data or compressed audiovisual data. Packets with a given PID represent sequential data that must be joined to create a single audiovisual component. For example, to transport an audiovisual component in the transport stream, the data for the audiovisual component is divided over the payloads of a group of data packets. The data packets of that group, and only of that group, will then use the same unique PID.

The transport stream further comprises a Program Association Table (PAT) which provides information of the programs that are included in the specific transport stream. Each program is characterized by a Program Map Table (PMT) which comprises information about the individual programs. Specifically, the PMT identifies the elementary streams comprised in the transport stream for the individual program, and in particular it lists the PIDs for the data packets that belong to the different elementary streams for the individual program.

FIG. 1 illustrates an example of how audio elementary streams for a program may be provided in the transport stream. In the example, three audio components are provided for the program. The audio components may be rendered together with a video component of the transport stream (not shown in FIG. 1). Each of the audio components correspond to a full representation of the audio soundstage of the content item, i.e. each elementary stream provides the entire audio soundstage data necessary for rendering (the term audio soundstage refers to the audio of the entire rendered content item and is not limited e.g. to a specific audio scene).

Each of the elementary streams provides a single integrated audio component which must be rendered in its entirety. Thus, if an elementary stream is selected for rendering, the renderer will decode all audio data of the elementary stream to generate the single audio component of the elementary stream. This audio component is then rendered (possibly in some cases after being mixed with audio from another stream).

Each of the audio components is provided in a separate elementary stream identified by a separate PID. The audio data for each audio representation is provided in a number of data packets (referenced as PR1$p$1, PR1$p$2 . . . PR2$p$1, PR2*p*2 . . . PR3*p*1, PR3*p*2 . . . etc., each packet having its own identification p1, p2 . . . and each group of packets given the identification of the audio presentation to which it belongs "PR"x). Thus, each of the audio components is in the transport stream represented by data packets comprising the encoded audio data for the audio component corresponding to the full audio representation. Each audio representation is provided as a single audio component in an individual elementary stream, and accordingly each audio representation is associated with a separate PID. In the example of FIG. 1, the audio representations are associated with respectively PID 1, PID 2, and PID 3.

As illustrated in FIG. 1, the data packets are time multiplexed into the transport stream. A receiver can receive the data packets, extract the audio data from each data packet associated with a specific PID, decode the audio data, and thus recreate the individual audio component/representation corresponding to that elementary stream.

In order to allow the receiver to synchronize the audio data from different data packets and to synchronize the resulting audio component to e.g. the associated video stream, each data packet comprises synchronization or timing data indicating the timing of the audio segment represented by the audio data of the data packet.

An advantage of providing a plurality of audio elementary streams is that a more flexible audio provision can be provided. For example, FIG. 1 illustrates an example wherein three audio elementary streams are provided. Each of the elementary streams provides a full representation of the audio scene including e.g. background data, music, dialogue etc. The full representation is provided by a single audio component. However, the three elementary streams provide different representations, e.g. the three elementary streams may correspond to the same video sequence but with audio in three different languages. For example, PID 1 may represent the original audio scene with dialogue in the original language, e.g. English, whereas PID 2 and PID 3 may represent the audio scene but with the dialogue overdubbed in e.g. French and German respectively. The PMT can provide data indicating the language associated with each individual elementary stream. Accordingly, a user may select a preferred language and the receiver may accordingly select the corresponding elementary stream. Thus, the receiver extracts the audio data from all packets with the corresponding PID and it then generates the audio output signal from this audio data. For example, a user may indicate a preference for the dialogue to be in French and accordingly the renderer may extract audio data from elementary stream packets with PID 2 and then generate the audio output from this audio data.

Accordingly, multiple alternative streams may be provided where each elementary stream provides a single audio component providing a complete representation of the audio for the content item (i.e. with the audio for the program). A receiver can then select between individual streams. Thus, in conventional transport streams for audio broadcasts, each alternative language is provided as a complete and independent audio representation given by a single audio component in a single elementary stream. The receiver can only select between the different available streams, and once a stream is selected, all the audio from that stream is rendered.

However, this approach results in a low degree of flexibility as only a single audio component corresponding to the entire audio sound stage is available to be rendered at the receiver. Furthermore, it results in a high data rate of the data streams as full audio representations are provided.

MPEG-2 Transport Streams do allow for supplementary audio components to be defined in order to provide additional Audio Description audio (additional audio providing descriptive comments for visually impaired users). Such supplementary audio components cannot be rendered by themselves but may be added to a full representation audio component from another elementary stream.

Thus, audio elementary streams of traditional MPEG-2 Transport Streams may be one of two types. The first type is the most typical type with a single audio component providing a full representation of audio for the content time. This audio can be rendered directly and is referred to as "broadcast mixed" audio. The second type provides only a single component with supplementary audio that must be added to (mixed with) an audio component of the first type. Thus, the second type of elementary data provides additional data which can be added to a full audio representation. This is referred to as "receiver mixed" audio.

In order to be able to decode a received transport stream, the transport stream includes information defining the data contained in the transport stream. In more detail, information on the programs comprised in the stream is indicated in the PAT. For each program, the number and types of audio components/tracks is made known to the receiver (e.g. a DVB Transport Stream Decoder) via the signaling in the PMT. The PMT information is PID based and specifically comprises a data structure loop which contains all the required signaling per PID. For each PID, there may specifically be a language descriptor and a codec specific descriptor. The language descriptor may be an ISO 639 Language descriptor or a Supplementary Audio descriptor. A supplementary audio description provides a clear differentiation between receiver and broadcast mixed audio signals. The codec specific audio description provides information about the contents of the packetized elementary stream of the given PID. This information is mainly about whether the component is a multichannel or stereo component.

Thus, in the current approach, each elementary stream provides a separate audio representation for the content item except for elementary streams indicated to be mixed by the receiver. These do not provide an audio presentation but instead provide an audio signal that must be added to a broadcast mixed audio signal.

In the following, an approach will be described, which provides a more flexible and efficient transport stream. The description will focus on an example where a plurality of languages is provided within the transport stream but it will be appreciated that the approach can be used with other types of audio as well.

Figure 2:
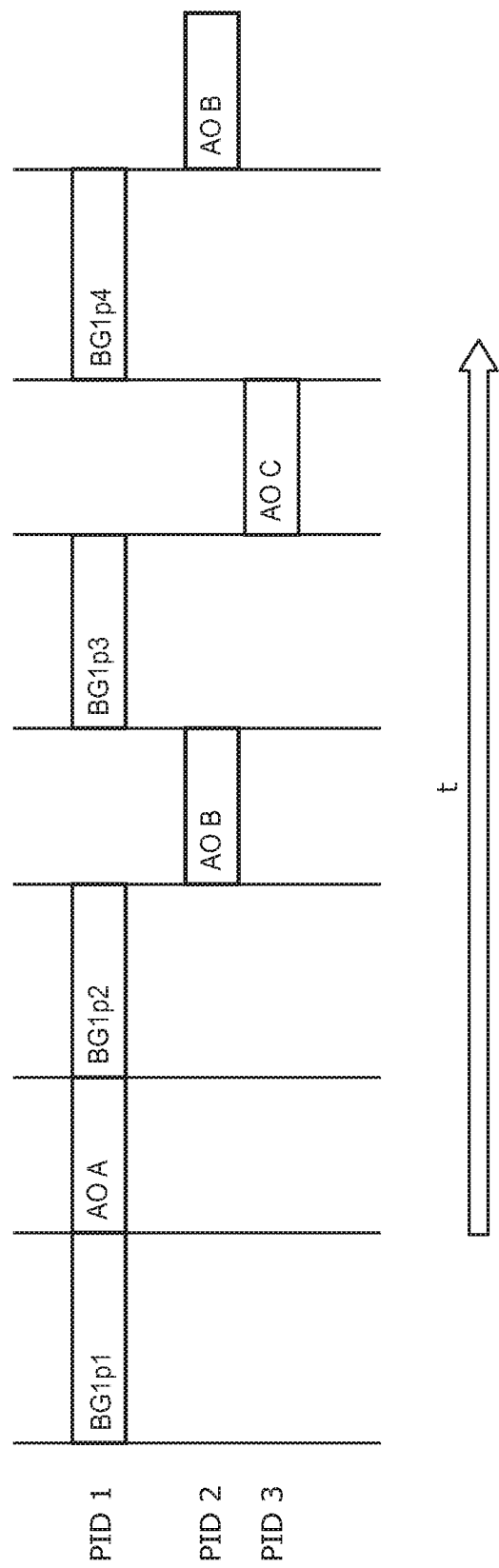
FIG. 2 is an illustration of a transport stream in accordance with some embodiments of the invention.

FIG. 2 illustrates an example of a modified transport stream. Similar to the approach of FIG. 1, the transport stream of FIG. 2 comprises a plurality of audio elementary streams. However, in contrast to the prior art, the elementary streams are not limited to complete audio representations or to supplementary audio data, and are not limited to single audio components. Rather, an elementary stream may comprise different types of audio data and specifically may comprise both data that is mandatory for the audio representation as well as replaceable audio data.

Specifically, the transport stream may include data defining/designating/describing one or more audio representations. A first elementary stream may be associated with an audio representation for the audiovisual content item represented by the transport stream. This first elementary stream comprises mandatory audio data for the audio representation as well as replaceable audio data for the audio representation. The mandatory audio data corresponds to a mandatory audio component that must be rendered when the audio representation of the elementary stream is rendered. In contrast, the replaceable data may be replaced by alternative audio for the audiovisual content item. Hence, the first elementary stream comprises both a mandatory audio component and a replaceable audio component for the audio representation where the replaceable audio component can be substituted by another audio component.

The first elementary stream/audio visual data stream can accordingly comprise a plurality of audio components or objects wherein one audio component/object is represented by the mandatory audio data. This audio component is mandatory and must always be rendered when the specific audio representation (associated with the first audio visual data stream) is selected, and thus when the first elementary stream is selected for rendering.

Another audio component is represented by replaceable audio data. This replaceable audio component is accordingly not mandatory for the representation but may be substituted by an alternative audio component. However, the replaceable audio component cannot merely be deleted or discarded while providing the audio presentation but rather can be replaced by an alternative audio component. The replaceable audio component can correspond to a necessary audio source for the audio representation but with different versions of the audio source being included in the transport stream.

In many embodiments, the transport stream may provide a default representation of the audiovisual content item where the mandatory audio component represented by the mandatory audio data and the replaceable audio component represented by the replaceable audio data together provide a default audio representation for the content item (possibly together with other data or audio components). Thus, the replaceable audio data typically corresponds to a default audio component. When rendering the audio representation, the receiver will as a default accordingly select the mandatory audio data and the replaceable audio data. Accordingly, it can decode the mandatory audio component and the replaceable audio component, mix the components together and render the resulting audio. This will result in the receiver rendering the default version of the audio representation of the content item.

However, the transport stream may at the same time comprise data for alternative audio. This alternative audio however does not need to be provided as complete alternative audio representations in separate elementary streams providing a full audio representation. Rather, alternative audio data is provided which may simply define an alternative audio component that can replace the replaceable audio component of the first elementary stream. Thus, the transport stream may comprise alternative audio data that can replace the replaceable audio data part of the first elementary stream.

The first elementary stream thus comprises two types of data, namely mandatory audio data for (at least) one mandatory audio component and replaceable audio data for (at least one) replaceable audio component.

Specifically, the first elementary stream can comprise data packets comprising mandatory audio data and data packets comprising the replaceable audio data. Each data packet may specifically comprise one of either mandatory audio data or the replaceable audio data, i.e. in many embodiments, a data packet will comprise only audio data for one audio component.

The mandatory audio component and the replaceable audio component are thus time parallel components, i.e. for a given rendering/content item time segment, the first elementary stream can comprise both mandatory audio data for a mandatory audio component and replaceable audio data for a replaceable audio component. The mandatory audio data and the replaceable audio data for the same time segment is however typically provided in different data packets that are time sequential in the first elementary stream and in the transport stream.

Similarly, the alternative audio data may be provided in data packets that are time sequential in the transport stream to the data packets of the mandatory audio data and the replaceable audio data of the first elementary stream yet provide audio data for the same (rendering) time segment.

Thus, the timing of data packets and data in the transport stream may be independent (and clearly not identical) to the timing of the corresponding audio in the audio components. Specifically, for at least one time segment, the elementary stream comprises separate audio data for a mandatory audio component and a replaceable audio component, i.e. it comprises both mandatory audio data and replaceable audio data for the time segment.

FIG. 2 illustrates an example wherein a first elementary stream is assigned PID 1. The first elementary stream does not only comprise a single audio component but instead comprises audio data for both a mandatory audio component and for a replaceable audio component.

Specifically, the mandatory audio component may correspond to general background audio (including e.g. music) for the content item. The data packets comprising mandatory audio data are in FIG. 2 referenced by BG1$p$1, BG1$p$2, BG1$p$3, BG1$p$4.

The replaceable audio component may correspond to the dialogue in a default language, for example English. The data packets comprising replaceable audio data is referenced by AO A in FIG. 2.

As illustrated, the mandatory audio data and the replaceable audio data are provided in individual data packets that are time multiplexed into the transport stream. In the example, the mandatory audio data and the replaceable audio data are provided in separate data packets, i.e. a data packet of the first elementary stream comprises either mandatory audio data or replaceable audio data. However, it will be appreciated that in some embodiments, a data packet may comprise both mandatory audio data and replaceable audio data.

A receiver rendering the default audio representation with the default language accordingly only needs to access the first elementary stream, i.e. it only needs to decode and process data packets with PID 1. It can then individually decode the mandatory audio data to generate the mandatory audio component and the replaceable audio data to generate the replaceable audio component. The audio signal for the content item can then be generated by mixing the mandatory audio component and replaceable audio component together.

However, in addition to the first elementary stream, the transport stream comprises further elementary streams that comprise alternative audio data for the replaceable audio data, i.e. it comprises data defining at least one alternative audio component that may replace the replaceable audio component.

In the example of FIG. 2, the transport stream comprises a second audio elementary stream identified by PID 2 and a third audio elementary stream identified by the PID 3. Accordingly, data packets corresponding to the second and third elementary stream are time multiplexed in the data stream with the data packets for the first elementary stream. The second elementary stream comprises data packets (referenced AO B) with first alternative audio data and the third elementary stream comprises data packets (referenced AO C) with second alternative audio data. The first alternative audio data can be decoded to generate a first alternative audio component, and the second alternative audio data can be decoded to generate a second alternative audio component.

Instead of generating an audio signal for the content item using the replaceable audio component, a renderer can use one of the alternative audio components, i.e. the generation of audio for the content item may be based on one of the sets of alternative audio data instead of being based on the replaceable audio data.

For example, the replaceable audio data may provide English language dialogue, the first alternative audio data may provide German dialogue, and the second alternative audio data may provide French dialogue. A receiver will then by default decode the first elementary stream, generate the background audio component and the English audio component, and mix these together to generate the audio for the content item. However, e.g. in response to a user input, the receiver may replace the replaceable audio data by the first alternative audio data, i.e. it may proceed to decode the mandatory audio data to generate the mandatory audio component and the first alternative audio data to generate the first alternative audio component. The output audio may then be generated by combining the mandatory audio component and the first alternative audio component. Thus, instead of the content item having English dialogue, the German dialogue is provided.

The approach allows for a very efficient communication and encoding of audio in a transport stream. Reduced data rates can be achieved and/or increased flexibility is provided. Furthermore, easy processing in terms of both generating and processing the transport stream is achieved.

Importantly, the specific approach may provide a high degree of compatibility with existing transport streams, such as the MPEG-2 Transport Stream. Specifically, it provides for an approach wherein the existing data structure and organization can be maintained and specifically the same approach of elementary streams can be used to provide increased flexibility. Indeed, the approach will minimize (or at least reduce) the amount of standardization effort required to adopt the novel approach. Furthermore, it may increase backwards compatibility and reduce or even minimize the required changes to support the additional functionality.

Specifically, the approach may use the same approach of the transport stream comprising a PAT defining one or more content items and specifically providing a PID for a PMT for each content item. The PMT for each content item may define a PID for each elementary stream associated with the content item (thus the content item may be made up of the elementary streams for which a PID is included in the PMT). The receiver can then retrieve the audiovisual data for the content item by selecting the data packets with a PID indicated in the PMT. However, as the content item may have alternative audio tracks, the receiver may e.g. select to ignore or extract data from a given PID depending on whether this PID comprises required audio data. For example, (and with reference to FIG. 2), if a German dialogue track is provided as alternative data in data packets with PID 2, the receiver can ignore these data packets if the English dialogue of PID 1 is desired. Thus, if the standard audio scene is desired, the receiver in this example need only consider PID 1 data packets to provide the desired audio. However, at the same time, if the alternative German dialogue audio track is preferred, the receiver can simply extract this audio data from the data packets of PID 2 and replace the replaceable audio data from PID 1 data packets with this audio data.

The approach allows for a high degree of operational efficiency. Indeed, the system can simply render a single elementary stream for nominal operation, and thus the approach not only provides different options but it can also treat one option as a preferred option. E.g. the original dialogue is included in the same elementary stream as the background audio, and thus this will always be provided unless e.g. a user specifically requests an alternative.

Figure 3:
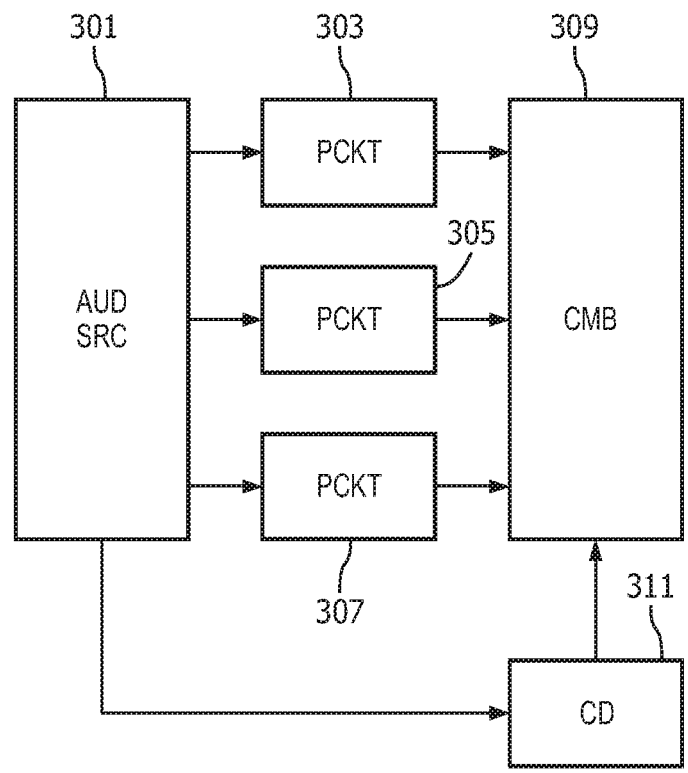
FIG. 3 is an illustration of an apparatus for generating a transport stream in accordance with some embodiments of the invention.

FIG. 3 illustrates an example of an apparatus for generating an audiovisual content item data stream, and specifically a transport stream such as the MPEG based transport stream of FIG. 2. The audiovisual content item data stream will henceforth be referred to as a transport stream. The content item is made up of a number of audiovisual components, such as one or more audio components and typically one or more video components. A content item may also include components that support interactivity. Each audio component may be an audio signal and in many cases may be an audio object. Each video component may be a video signal corresponding to a single moving image, or may e.g. be a view of a multi view moving image. A content item may also include components that support interactivity. For example, an interactivity component may be available to aid the user in his selection of an audio object and/or video component.

The apparatus generates a transport stream which comprises a plurality of individual audiovisual data streams. The audiovisual components of the content item are accordingly distributed over a plurality of individual audiovisual data streams. Each of the individual audiovisual data stream accordingly corresponds to an elementary stream as previously described, and will be referred to as an elementary stream. Each elementary stream may be associated with a unique (within the transport stream) packet identifier, such as specifically with a PID.

The plurality of elementary streams (audiovisual data streams) accordingly comprises the audiovisual components of the content item. In the approach of FIG. 1, each audiovisual component is comprised in a single elementary stream. However, in contrast, the apparatus of FIG. 2 is arranged to generate the transport stream such that at least a first of the elementary streams comprises a plurality of audiovisual components.

The audiovisual components are comprised in the elementary streams by the elementary streams comprising encoded data for the audiovisual components. Thus, each elementary stream comprises encoded data representing at least one audiovisual component. In some embodiments, some elementary streams may additionally be provided which comprise meta-data such as control data, interactive data, etc.

As previously described, the elementary streams are made up of a plurality of time multiplexed data packets, and accordingly the encoded data for the audiovisual components are included in data packets of the transport stream. Thus, the timing of the individual data packet in the transport stream does not directly correspond to the timing of the segment of the audiovisual component in the data packet when this is rendered. In order to ensure correct timing of the rendering, each elementary stream comprises synchronization information allowing it to be synchronized to audiovisual components in other elementary streams. Specifically, each data packet can include synchronization data defining the timing of the content segment represented by the data packet.

The description and illustration of FIG. 3 will focus on the part of the transport stream relating to audio components. It will be appreciated that, in addition, the transport stream may be generated to include meta data, control data, video content items (and possibly other audio items) etc. For example, the approach well known from various implementations of conventional MPEG-2 Transport Stream may be used for such data.

The apparatus of FIG. 3 comprises an audio source 301 which provides encoded audio data for a plurality of audio components. In some embodiments, the audio source 301 may receive a plurality of audio components and it may proceed to encode these individually. The encoding may use the same encoding algorithm or may in many embodiments use different encoding algorithms and standards for different audio components. Also, encoding parameters, such as e.g. the resulting data rate, may be the same or may be different for different audio components.

In other embodiments, the audio source 301 may directly provide the encoded audio data. For example, the audio source 301 may be a local storage in which a number of encoded audio components are stored.

The audio source 301 specifically provides encoded audio data for audio components representing the content item. It typically provides all audio to be reproduced when reproducing a video component included in the transport stream. For example, for a film, one or more elementary streams may provide the video for the film (e.g. different elementary stream may provide different resolutions of the video). The audio source 301 may provide the associated audio divided into a number of audio components.

In the approach of FIG. 3, a single elementary stream is generated which comprises a full representation of an audio soundstage to be rendered in connection with rendering the content item. For example, one elementary stream is generated which comprises all audio required to render the audio of e.g. a film or television program.

The transport stream may specifically be generated to explicitly comprise data defining one or more audio representations. The definition of an audio representation may e.g. be provided by a direct or indirect identification of audio data corresponding to mandatory audio data and replaceable audio data for the audio representation. Typically, the definition of the audio representation may also include and identification of alternative audio data that may replace the replaceable audio data.

In the approach, the first elementary stream does not comprise a single audio component but instead comprises both a mandatory audio component and a replaceable audio component. Thus, the elementary stream is generated to include both mandatory audio data for the mandatory audio component and replaceable audio data for the replaceable audio component as previously described. The mandatory audio component may specifically correspond to a background audio and the replaceable audio component may correspond to the main dialogue in the original language (e.g. English)).

In the example of FIG. 3, the audio source 301 provides mandatory audio data for the mandatory audio component to a first packetizer 303. The first packetizer 303 proceeds to packetize the mandatory audio data. This packetization includes dividing the mandatory audio data into blocks of suitable size. It also includes adding synchronization data to the data packets. In addition, the first packetizer 303 adds a header with relevant information allowing the correct decoding of the data packet. The header is specifically generated to include a PID, and the PID allocated to the first elementary stream is accordingly included in the data packet.

Similarly, the audio source 301 provides replaceable audio data for the replaceable audio component to a second packetizer 305. The second packetizer 305 proceeds to packetize the replaceable audio data. This packetization similarly includes dividing the replaceable audio data into blocks of suitable size, adding synchronization data, and a packet header. As for the first packetizer 303, the second packetizer 305 generates the header to include a PID corresponding to the PID allocated to the first elementary stream. Thus, the data packets for both the mandatory audio component and the replaceable audio component have the same PID and are accordingly part of the same elementary stream.

The audio source 301 furthermore provides alternative audio data to a third packetizer 307. The third packetizer 307 proceeds to packetize the replaceable audio data. This packetization similarly includes dividing the replaceable audio data into blocks of suitable size, adding synchronization data, and a packet header. As for the first packetizer 303, the third packetizer 307 generates the header to include a PID. The alternative audio data is as previously described an alternative to the replaceable audio data. Thus, the alternative audio data is data which encodes an alternative audio component that may be used instead of the replaceable audio component. For example, the alternative audio component may correspond to a dubbed language (e.g. German) and this may replace the original language (e.g. English) when rendering the content item comprised in the transport stream.

In the specific example, the alternative audio data is included in a different elementary stream than the first elementary stream and accordingly the alternative audio data is generated to have a different PID than the data packets for the mandatory audio data and replaceable audio data. However, as will be described later, the alternative audio data may in some embodiments be included in the first elementary stream itself, and thus in some embodiments the data packets may be generated to have the same PID as for the mandatory audio data and alternative audio data.

The first, second and third packetizers 303, 305, 307 are coupled to a stream generator 309 which proceeds to generate the transport stream by time multiplexing the data packets from the packetizers 303, 305, 307. It will be appreciated that typically a number of other audio components may also be encoded. These audio components (including possibly both mandatory audio components for other audio representations or, further alternative audio components) may be packetized in a similar way. The stream generator 309 may be arranged to further include such data packets in the transport stream by time multiplexing. Similarly, data packets may be generated for video components, possibly mixed audiovisual components, meta-data or control data, and the resulting data packets may be included in the transport stream by time multiplexing.

The apparatus furthermore comprises a control data generator 311 which is arranged to generate control data for the transport stream. The control data generator 311 specifically generates control data which describes which data is included in the transport stream. Specifically, the control data generator 311 can generate PATs and PMTs. The resulting data packets are fed to the stream generator 309 which proceeds to include the data in the transport stream. The control data generator 311 can specifically include data defining or describing the data associated with a specific audio representation for the content item.

Thus, the apparatus of FIG. 3 may generate a transport stream such as the one described with reference to FIG. 2, i.e. a transport stream can be generated in which at least a first elementary stream comprises data for a plurality of audio components wherein at least one audio component is mandatory for the audio representation of the content item whereas the other audio component may be replaced by another audio component. Thus, the previously described advantages can be achieved by the apparatus of FIG. 3.

Figure 4:
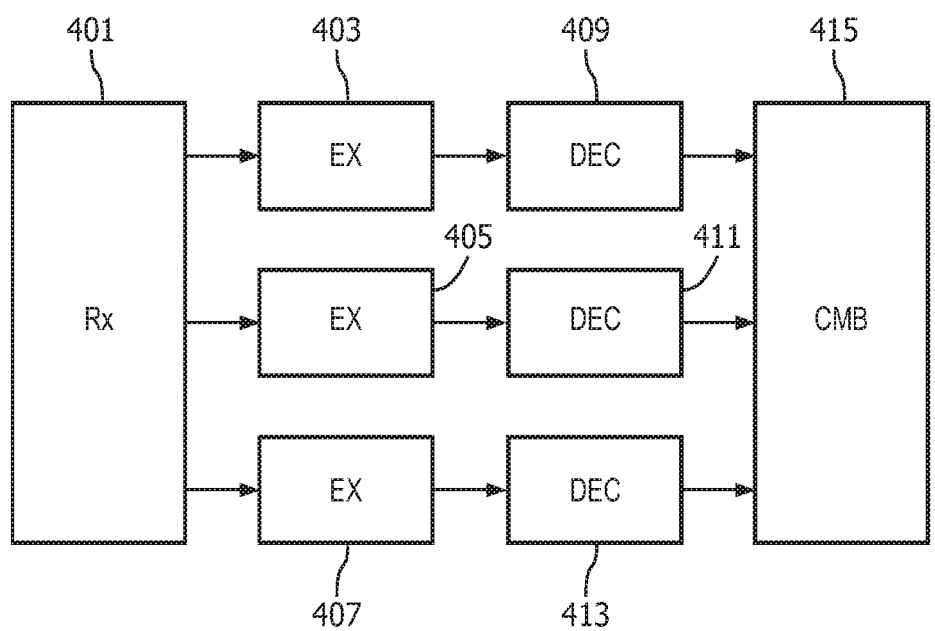
FIG. 4 is an illustration of an apparatus for generating a transport stream in accordance with some embodiments of the invention.

FIG. 4 illustrates an example of an apparatus for generating an audio signal for an audiovisual content item. Specifically, the apparatus receives the transport stream from the apparatus of FIG. 3 (specifically a transport stream is shown in FIG. 2) and generates an audio output signal for the content item. The output signal may typically be used for rendering of the audio and the apparatus of FIG. 4 will accordingly be referred to as a renderer.

The renderer comprises a transport stream receiver 401 which receives the transport stream.

The renderer further comprises a first data extractor 403 which is arranged to extract the mandatory audio data from the received transport stream. Specifically, the first data extractor 403 is arranged to detect data packets with the PID corresponding to the first elementary stream. It can then from these data packets extract the data from the subset of data packets for which the data corresponds to the mandatory audio component.

The renderer also comprises a second data extractor 405 which is arranged to extract the replaceable audio data from the received transport stream. Specifically, the second data extractor 405 is arranged to detect data packets with the PID corresponding to the first elementary stream. It can then from these data packets extract the data from the subset of data packets for which the data corresponds to the replaceable audio component.

Information of whether the individual data packet comprises replaceable audio data or mandatory audio data may in some embodiments be provided by control or metadata of the transport stream not comprised in the first elementary stream. For example, a PMT may be provided which for the first elementary stream defines an order of data packets in the elementary stream. For example, it may define a repeating sequence of two data packets with mandatory audio data followed by one data packet of replaceable audio data. In other embodiments, the information may alternatively or additionally be provided in the individual data packets. For example, a flag in the header of each data packet may indicate whether the data packet comprises mandatory audio data or replaceable audio data. In simple embodiments, a simple one bit flag may be provided. In other embodiments, an identity of the individual audio component of the elementary stream may be provided.

The renderer also comprises a third data extractor 407 which is arranged to extract alternative audio data from the received transport stream. Specifically, in examples where the alternative audio data is provided in a different elementary stream, the third data extractor 407 may be arranged to detect data packets with a PID corresponding to this different elementary stream. It can then from these data packets extract the alternative audio data.

The first data extractor 403 is coupled to a first decoding unit 409 to which the mandatory audio data is provided. The first decoding unit 409 then proceeds to decode the mandatory audio data to generate the mandatory audio component.

Similarly, the second data extractor 405 is coupled to a second decoding unit 411 to which the replaceable audio data is provided. The second decoding unit 411 then proceeds to decode the replaceable audio data to generate the replaceable audio component.

Correspondingly, the third data extractor 407 is coupled to a third decoding unit 413 to which the alternative audio data is provided. The third decoding unit 413 then proceeds to decode the alternative audio data to generate the alternative audio component.

In some embodiments, the first, second and third decoding units 409, 411, 413 may utilize the same decoding algorithm, i.e. the same encoding algorithm or standard may have been used to generate the encoded audio data. However, even in such embodiments, the different decoding units (and thus encoders at the source end) may have different encoding/decoding parameters. Specifically, the data rate of the audio data may be different for the mandatory audio data, the replaceable audio data and/or the alternative audio data, and accordingly the decoding units may decode audio data with different data rates.

In some embodiments, at least two of the first, second and third decoding units 409, 411, 413 may utilize different decoding algorithms, i.e. different encoding algorithms or standards may have been used to generate the encoded audio data.

Thus, the approach may allow for individual optimization or adaption to the characteristics and preferences of each individual audio component. The decision of encoding settings/algorithms may be performed dynamically e.g. based on characteristics of the audio components.

The first, second and third decoding units 409, 411, 413 are coupled to a combiner 415 which is arranged to generate an output signal by combining the mandatory audio component with one of the replaceable audio component and the alternative audio component. The combining may in many scenarios be a simple (possibly weighted and/or frequency selective) addition or mixing.

Specifically, when operating in the default mode, the output signal is generated by combining the mandatory audio component and the replaceable audio component. In this way, the output signal is generated to correspond to the default audio representation for the content item. In the specific example, an audio track with English language dialogue is generated for the video component.

However, e.g. in response to an explicit user input, the apparatus of FIG. 4 may instead generate the output signal by combining the mandatory audio component and the alternative audio component. Thus, in this scenario, the apparatus proceeds to replace the replaceable audio component by the alternative audio component. This may for example result in an audio track with dubbed German language dialogue being generated for the video component.

The output audio signal may then e.g. be rendered or reproduced by driving a loudspeaker based on the output audio signal. Such driving may be via a suitable driver circuit, e.g. including a power amplifier, filter etc. as is well known in the art. It will also be appreciated that the approach may be used for multichannel signals—e.g. by all the data, components and processing directly being in the multichannel domain (e.g. the audio data may represent encoded multichannel signals that are decoded to generate multichannel audio components which can then be selected and combined by a multichannel combiner). As another example, the described approach may be performed individually for each individual channel of a multichannel signal.

As yet another example, single channel and multichannel audio components may be mixed, e.g. the mandatory audio component may be a multichannel signal and the replaceable and alternative audio components may be single channel signals.

In the previous example, the replaceable audio data is replaced by the alternative audio data by the combiner 415 selecting to combine the alternative audio component and the mandatory audio component. It will be appreciated that in some such embodiments, the apparatus of FIG. 4 may not extract or decode the data that is not being used. Specifically, if default operation is selected, the apparatus will not extract the alternative audio data and decode the alternative audio component. Similarly, if the alternative audio data is used to generate the output signal, the apparatus may not extract the replaceable audio data or decode the replaceable audio component.

In the example, the replacement (or non-replacement) of the replaceable audio data by the alternative audio data is performed by selecting the audio component being combined with the mandatory audio component. However, it will be appreciated that the selection and replacement may be performed directly in the encoded audio data domain. For example, the same decoder may be used for all audio components being decoded and the apparatus may be arranged to directly substitute the replaceable audio data by the alternative audio data in a data stream being fed to the decoding unit.

In some embodiments, combination of the mandatory audio and the replaceable (default) audio or the alternative audio may be performed in the compressed and/or encoded domain. In such an embodiment, a combiner 415 may be provided with the relevant compressed/encoded audio data from the data extractors 403, 405, 407 and it may proceed to select and combine the desired audio data. The combined audio data may then be fed to a single decoding unit which decodes the combined audio data.

The alternative audio data may be provided in different parts of the transport stream in different embodiments, or indeed may even in some cases be provided externally from the transport stream.

Thus, in some embodiments the apparatus may be arranged to receive a second transport stream from the same source or from a different source. The apparatus may be arranged to process this second transport stream, and may from this extract an alternative audio component which can replace the replaceable audio component from the first transport stream as previously described for an alternative audio component comprised in the same transport stream. The second transport stream may for example be received from another source via an Internet connection.

Such an approach may for example allow the replaceable audio component to be retrieved from a different provider, e.g. over an Internet connection. It may for example enable a third party to provide dubbing languages for e.g. movies.

A specific example of a second transport stream may thus be a transport stream received or retrieved from a different data source or from a different file than the first transport stream. For example, the first transport stream may be received from a primary data source by a broadcast transmission. For example, the first transport stream may be from a television station broadcasting the first transport stream to a large number of receivers and users. Thus, this communication may e.g. be a point to multi-point radio broadcast. However, the second transport stream comprising alternative audio data may be transmitted directly to the individual user through a different communication medium, such as for example via the Internet. The second transport stream may be transmitted as a point to point transmission directly to the individual receiver/user. The second transport stream may indeed even be specifically requested by the user, and provided via an interactive medium, such as the Internet. Such an approach may allow efficient distribution and communication while at the same time allowing a very high degree of potential user customization.

Accordingly, the second transport stream may possibly be retrievable from or via a different source than the first transport stream. In the case of files, the transport streams may be from different files. A different source for the second transport stream may also be e.g. a different medium (e.g. the first transport stream may be retrieved from a Blu-ray disc and the second transport stream may be from a radio transmission). The main source providing the first transport stream may be a broadcast, or multicast signal, while the second source providing the second transport stream may be one targeted for a specific individual.

In many embodiments, however, the alternative audio data will be part of the same transport stream.

Specifically, the apparatus generating the transport stream in some embodiments include the alternative audio data in a different elementary stream in the transport stream. This may provide a particularly efficient approach, and may in many scenarios facilitate operation and signaling, and may provide for more efficient transport stream. In such embodiments, a receiver may extract the alternative audio data by identifying data packets with a PID corresponding to the elementary stream in which the alternative audio data is comprised.

Figure 5:
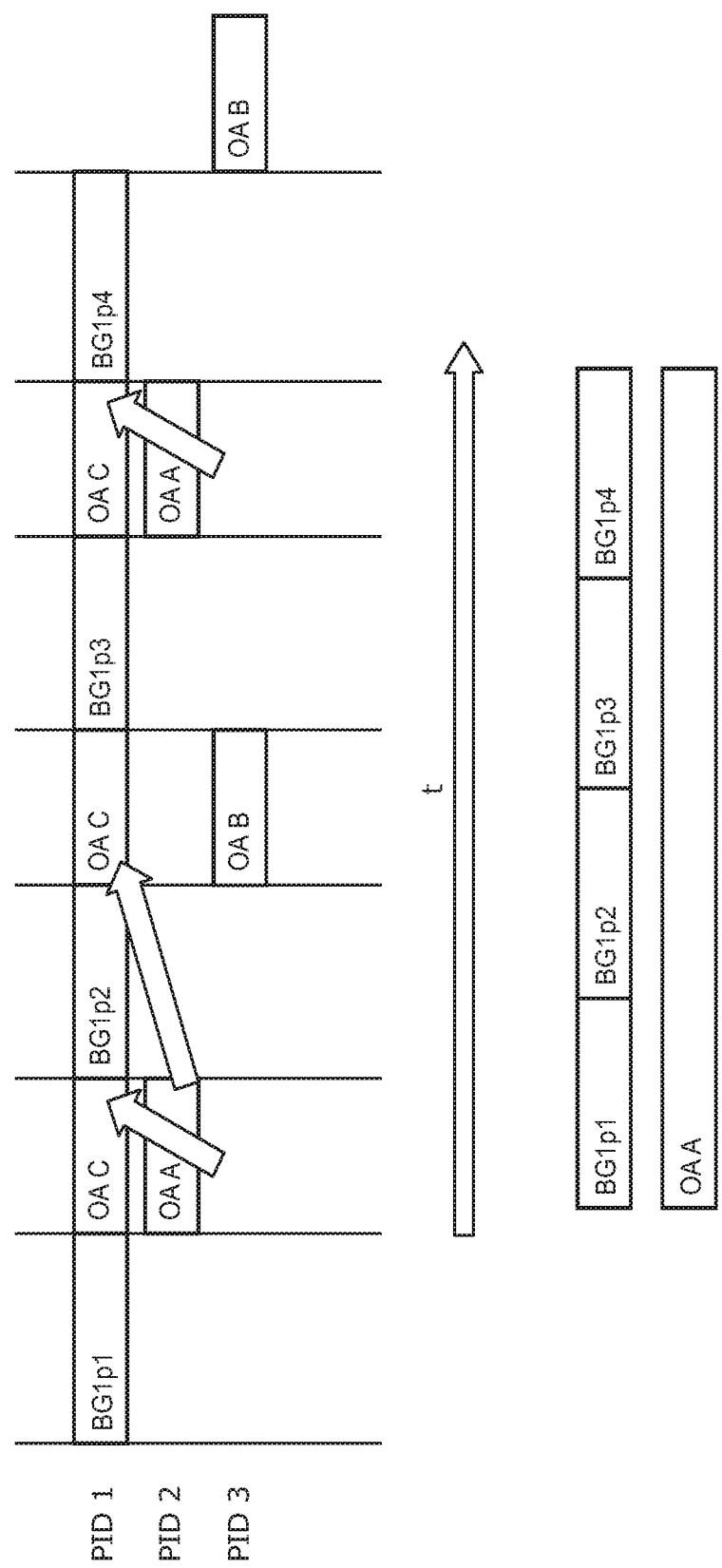
FIG. 5 is an illustration of a transport stream in accordance with some embodiments of the invention.

An example of such a scenario is shown in FIG. 5. In the example, an elementary stream with a PID of 1 comprises two audio components, namely a mandatory audio component corresponding to background sounds and the replaceable audio component corresponding to a default language. The mandatory audio component is represented by audio data in data packets referenced as BG1$p$1, BG1$p$2 etc. and the replaceable audio component is provided by audio data in data packets referenced as OA C. In addition, a second elementary stream with a PID of 2 comprises an alternative audio component represented by audio data in data packets referenced as OA A. A third elementary stream with a PID of 3 also provides an alternative audio component represented by audio data in data packets referenced as OA B. It is noted that in FIG. 5, the data packets for OA A and OA B are shown to be simultaneous with the data packets for OA C. This may reflect scenarios wherein these data packets may indeed be included simultaneously (e.g. with channel interleaving across the data packets). However, it will also be appreciated that in many embodiments, the data packets may be time multiplexed. The two alternative audio components may correspond to different languages that can replace the language of the replaceable audio component. Specifically, as illustrated in FIG. 5, the alternative audio data of elementary stream PID 2 may replace the replaceable audio data of the elementary stream OA C.

Thus, a renderer may extract the background audio data (the mandatory audio data) from the elementary stream PID 1 and decode this to generate a mandatory audio component corresponding to background audio. In addition, it may extract the alternative audio data from the elementary stream PID 2, and decode this to generate an alternative audio component corresponding to one of the dubbed languages. The two components are then combined to generate the output signal which is rendered/reproduced.

As indicated in FIG. 5, the data packets for the replaceable audio data and the alternative audio data do not necessarily correspond to each other. For example, they may be encoded differently (e.g. different encoding parameters, data rate or encoding algorithms) and may specifically correspond to different time intervals or segments. However, if e.g. separate decoding followed by combination of the audio components is used, such differences can be addressed by adapting the different decoding paths and the combination of the decoded signals.

In some embodiments, the second elementary stream may not only comprise the alternative audio component but may e.g. comprise multiple alternative audio components.

Indeed, in some embodiments, the second elementary stream may further comprise mandatory audio data for a different representation for the content item. Thus, in some embodiments, the second elementary stream may be an elementary stream that itself provides a different audio representation for the content item. Accordingly, a receiver may be capable of generating a soundtrack for the content item using only the audio data of the second elementary stream. For example, the second elementary stream may comprise mandatory audio data and replaceable audio data for an alternative audio representation for the content item. In such an example, the alternative audio data for the first elementary stream (and thus the first representation) may for example be replaceable audio data of the second elementary stream (i.e. for the second representation).

In some embodiments, the alternative audio data may be provided in the first elementary stream itself, i.e. it may be part of the same elementary stream that includes the mandatory audio data and the replaceable audio data. Thus, the apparatus of FIG. 3 may be arranged to include alternative audio data in the first elementary stream by time multiplexing data packets including the alternative audio data into the transport stream, where the PID of these data packets is the same as for the data packets with the mandatory audio data and the replaceable audio data. The apparatus of FIG. 4 may as a default extract the audio data from the data packets comprising the mandatory audio data and the replaceable audio data and proceed to generate the output audio signal from this data. However, e.g. in response to a user input, the apparatus may instead extract the alternative audio data from the appropriate data packets and generate the audio output signal using this data instead of the replaceable audio data.

Figure 6:
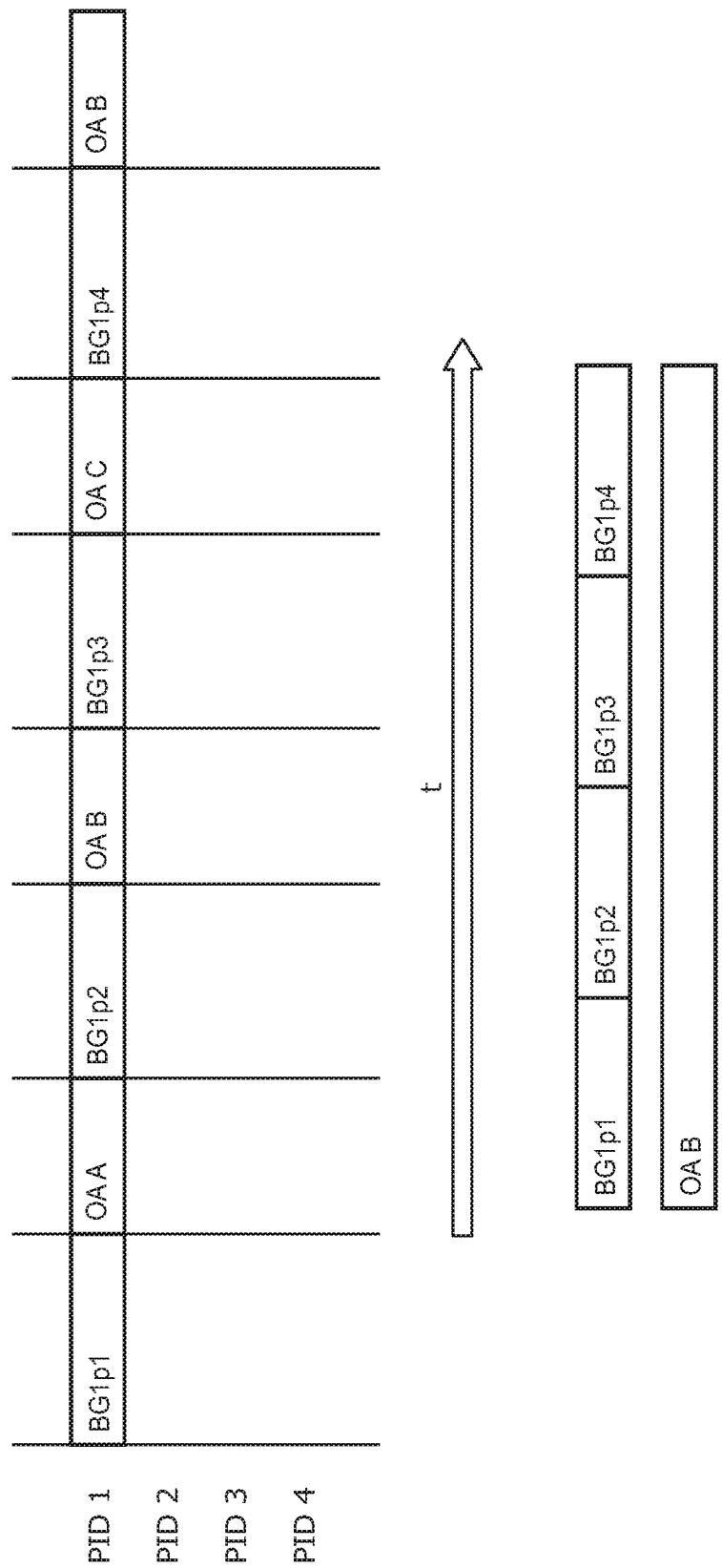
FIG. 6 is an illustration of a transport stream in accordance with some embodiments of the invention.

An example of such an approach is shown in FIG. 6 where the first elementary stream comprises data packets with mandatory audio data (BG1*p*1 . . . ), with replaceable audio data (OA A) and with alternative audio data (OA B, OA C). In the example, the mandatory audio data is extracted to generate the mandatory audio component, and the data from data packets OA B is extracted and decoded to generate an alternative audio component instead of the default replaceable audio data. The output signal is generated by combining the decoded mandatory audio component and the decoded alternative audio component.

The previous description has focused on examples where the alternative audio data corresponds to different audio components, such as to different languages. However, it will be appreciated that the described approach is not limited to such an example.

Indeed, in some embodiments, the replaceable audio data and the alternative audio data may represent the same audio content encoded using different encoding characteristics. Specifically, the replaceable audio data and the alternative audio data may correspond to the same audio content, and specifically the same audio component, but encoded with different bit rates.

This may provide increased flexibility and for example may allow a receiver to receive a transport stream and efficiently and with low complexity generate a transport stream corresponding to the same audio content but with a different data rate. Thus, the selection between replaceable audio data and the alternative audio data may be dependent on characteristics of the data itself, such as dependent on the specific data rate and the desired data rate. The approach may allow increased flexibility, and may specifically allow a flexible adaptation of the characteristics of a transport stream.

In some embodiments, the alternative audio data may for example be an audio object, such as a SAOC audio object, representing multiple sub-objects.

In some embodiments, the apparatus of FIG. 3 may be arranged to include rendering control data in the transport stream. The rendering control data may specify a required, desired or suggested rendering parameter for a rendering the audio of the transport stream. For example, the rendering control data may provide an indication of an absolute or relative level of the audio components.

The rendering control data may specifically provide a different rendering parameter for when the replaceable audio data is used than for when the alternative audio data is used.

The rendering control data may for example describe a relative gain or signal level for the output signal when the default audio is rendered, i.e. when the output signal is generated based on the mandatory audio data and the replaceable audio data. It may further describe a different relative gain or signal level for the output signal when the alternative audio is rendered, i.e. when the output signal is generated based on the mandatory audio data and the alternative audio data.

Such an approach may for example be used to provide differences between the rendering, e.g. the audio may be rendered louder when the default audio signal is rendered than when the alternative audio signal is rendered. However, the approach may also be used to homogenize the output signal. For example, in situations wherein the level of the replaceable audio component is higher than the level of the alternative audio component, the rendering control data may increase the overall gain of the output signal when using the alternative audio component resulting in the level difference being reduced.

In some embodiments, the rendering control data may describe different rendering for the replaceable audio component and the alternative audio component. For example, the gain for the replaceable audio component may be different from the alternative audio component. This may e.g. allow customization. As a specific example, German language TV broadcasts may tend to have higher relative levels of commentator sound relative to crowd noises for sports events than English language TV broadcasts. Accordingly, different gains may be set for two different language components such that the same effect can be provided from a single transport stream with alternative languages.

In some embodiments, the rendering control data may provide different rendering parameters for (possibly only) the mandatory audio data/mandatory audio component depending on whether the output signal is generated on the basis of the replaceable audio data/replaceable audio component or the alternative audio data/alternative audio component.

In order to allow a receiver to fully utilize the provided transport stream, the transmitter may include additional data that can signal information about the different data comprised in the transport stream.

Specifically, in some embodiments, the apparatus of FIG. 3 may be arranged to include an indication that the first elementary stream comprises replaceable audio data. This indication may for example be provided as part of separate configuration data for the transport stream. E.g., data packets may be provided that comprise configuration packets specifying the different elementary streams of the transport stream. Specifically, configuration data may be provided which includes PMTs. In such a case, the part of the PMT defining the individual elementary stream may be enhanced to also include information that defines which audio components are represented in the elementary stream, and specifically whether the individual elementary stream comprises more than one audio component. E.g. a flag may be set to indicate that a given elementary stream comprises replaceable audio data.

In some embodiments, the transport stream may be generated to include extraction data for the replaceable audio data in the elementary stream. Such extraction data may for example specify how the replaceable audio data can be identified. E.g., it may comprise an indication of which data packets include replaceable audio data and which data packets include mandatory audio data. The description may e.g. be provided by describing the audio components included in the elementary stream and associating each with an identity. Each data packet can then include an audio component identity in the header to indicate for which audio component the data packet comprises audio data. The extraction data may provide the audio component identity for each audio component thereby allowing the receiver to extract the relevant information.

Specifically, for an MPEG-2 Transport Stream, the supplementary audio descriptor may be extended with the definition of an object. An example of the syntax of a supplementary audio descriptor is provided in FIG. 7. FIG. 8 illustrates conventional use of respectively the data items mix_type and editorial_classification.

In this example, the mix_type data structure may be changed from that of FIG. 8 to that of FIG. 9. The editorial_classification may be changed to that of FIG. 10. Furthermore, an AAC descriptor component such as that of FIG. 11 may be used.

This example shows that the reserved bit, under the editorial_classification data structure, can be used, to indicate if the audio contains objects which can be manipulated. In the case mixed_type equals 1, the object bit value 1 indicates that the audio track is a background object and must be mixed with an object. If the object bit is 0, it is the current case, this indicates that the audio track is complete and may be complemented with an object or another mix_type 0 stream.

With the editorial_classification data structure, the use-case of a replaceable object can be signaled. The identification of that replaceable object can be placed in the AAC descriptor. The only signal that needs be given at this level is the identification that there is a replaceable object.

The extension of the AAC descriptor may specifically include a loop of objects with a descriptor per object describing its attributes, such as specifically:

The language of an object.
Replacability: This may signal that the object is the default object in the stream and can be replaced by another object (and optionally a link to that alternative object may be included).
Whether this is an object that a user may select to add it to the whole or chooses to leave it out. For example, it may be a special sound track for the disabled or contain special commentary. This gives an operator the possibility to offer a commentary track at very limited bandwidth cost.
An indication of text that can be displayed with the object to make it clear to a user that it is an interactive object. For example, it may be possible for a user to select this object, put it at another position, or make it louder or softer for example.
Providing a link to a video object that is coupled to the audio object. An interactive object may also have the capability to be moved together with its video counterpart. For example, it may be possible to "zoom into" an object. The zoom can be visualized by the video object and the loudness by the audio object, The user then has the illusion that the object indeed comes closer because only the audio of that object alone becomes louder.

Furthermore, an object in the audio payload header (UsacConfig) can be extended with a unique identifier via the metadata descriptor. This identifier may be included in the descriptor in the PMT to allow identification of the object. This identifier may also be an XML description in a file that describes the audio content.

FIG. 12 illustrates how an object may be identified in the UsacConfig.

Figures 13, 14:
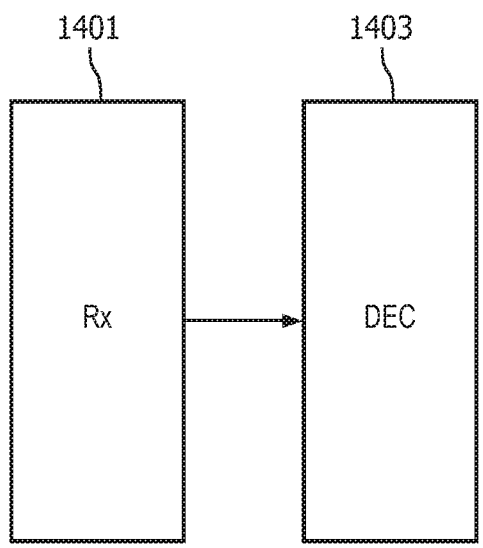
FIG. 13 illustrates an example of a syntax of an object descriptor for allowing an object to delegate its content to a SAOC object.
FIG. 14 illustrates an example of a receiving apparatus which comprises a receiver coupled to an audio decoder, wherein the receiver receives the audiovisual content item data stream.

FIG. 13 illustrates an example of a syntax of an object descriptor, for allowing an object to delegate its content to a SAOC object.

In many embodiments, the audiovisual content item data stream may accordingly have data, including audiovisual data, control data, metadata etc., structured in a hierarchical arrangement.

Specifically, the audiovisual content item data stream (specifically a transport stream) may comprise a data stream content item descriptor which defines the content items that are included in the audiovisual content item data stream. The data stream content item descriptor may specifically be assigned to a predetermined packet identifier, which specifically may be standardized, and thus will be known both at the transmitting and receiving end. Thus, a receiver can detect the data packets with the predetermined packet identifier and can from these data packets extract data to determine which content items are included in the audiovisual content item data stream. For example, for an MPEG transport stream, the transport stream may include a PAT which is included in data packets with a predetermined PID of 0.

The data stream content item descriptor may specifically for each content item provide a pointer to a content item map table for the content item. The content item map table for a content item may comprise a list of audiovisual data stream packet identifiers for data packets for audiovisual data streams linked to the content item. Thus, the content item map table comprises a packet identifier for each audiovisual data stream that provides audiovisual data for the content item, including e.g. video data, mandatory audio data, replaceable audio data, alternative audio data, and additional audio data. In addition, the content item map table may comprise pointers and specifically packet identifiers for data streams providing e.g. meta-data, control data etc. for the content item. The content item map table may be a program map table.

Specifically, for an MPEG type data stream, the PAT may for each content item include a packet identifier for a PMT. The PMT for a program/content item may then include a PID for each elementary data stream providing audiovisual data for the program.

The audiovisual data streams are accordingly provided in data packets with packet identifiers corresponding to those indicated in the content item map table. For example, as previously described, mandatory and replaceable audio data may be provided in one audiovisual data stream by providing the audio data in packets with one packet identifier, first alternative data may be provided in another audiovisual data stream by providing the audio data in packets with another packet identifier, second alternative data may be provided in another audiovisual data stream by providing the audio data in packets with a third packet identifier etc. The content item map table is generated to include the packet identifiers of the respective audiovisual data streams.

The approach provides a high degree of flexibility and allows a source to generate audiovisual content item data streams that suit the particular scenario and which provide the desired content items in a desirable way. It may further substantially facilitate the extraction of data by a receiver. Specifically, a receiver essentially only needs to monitor the packet identifiers to select the required data and it can simply ignore all data packets that do not contain required data.

For example, a receiver may initially monitor the received packets for the packet identifier of the data stream content item descriptor, i.e. specifically, it may monitor for the predetermined PID of the PAT (PID 0 in the case of MPEG).

When this is detected, the receiver extracts the data and selects the desired content item. The packet identifier for the content item map table, specifically the PID for the PMT for MPEG, is then extracted for this content item.

The receiver then scans for data packets with this packet identifier. The data for these data packets are extracted thereby providing the packet identifiers for the audio visual data streams that comprise data for the content item. The receiver can then proceed to scan for the data packets containing these identifiers while ignoring all other data packets. The approach in particular allows practical and low complexity multiplexing and de-multiplexing of audio visual data.

Thus, the approach provides a low complexity and low resource approach for extracting relevant data from audiovisual content item data streams.

However, in some embodiments, the audiovisual content item data stream may be generated to allow a number of the audio visual data streams to be treated as a single audio visual data stream. Specifically, rather than use standard packet identifiers, the approach may use a combined or concatenated identification approach. Specifically, an audio visual data stream may be associated with both a primary identifier and a secondary identifier where the primary identifier may be a common identifier for at least two of the audio visual data streams.

The primary identifier may specifically be a common data stream packet identifier, i.e. it may be a packet identifier which identifies a (combined) data stream. As the primary identifier is common for a plurality of audio visual data streams, the primary identifier can be considered to define a common or combined audio visual data stream which is a combination of all the audio visual data streams that share the primary identifier.

The primary identifier is in many embodiments included in the content item map table. Thus, the content item map table is generated to include the primary identifier, and thus the content item map table thereby provides a pointer to a single data stream which is a combined data stream of a plurality of individual audio visual data stream.

Indeed, in many embodiments, the apparatus of FIG. 3 may be arranged to generate the content item map table to include only a single primary identifier for all audio visual data streams comprising audio, or indeed for all audio visual data streams, for the content item represented by the content item map table.

Indeed, in some embodiments, the content item map table may be generated to include only one audiovisual data stream packet identifier for the content item in the content item map table, or to include only one audiovisual data stream packet identifier for audio data for the content item in the content item map table. Thus, for a given content item, the common packet identifier represents all audio or audiovisual content for the content item, and indeed the content item may be processed based on the primary identifier as if it comprised only a single audio visual data stream (or a single audio visual data stream for audio).

As a specific example, for an MPEG type transport stream, the PMT for a content item may be generated to include only one PID for all audio elementary streams, or indeed for all audio or video elementary streams, for the content item. Thus, the content item will be linked to only a single PID for all audio or for all audio and video.

Accordingly, in some embodiments, the audio visual data stream may to processing devices such as receivers, multiplexers, demultiplexers etc. appear to have fewer audio visual data streams than is actually the case. Specifically, the audio visual data stream may appear to have only a single audio or a single audiovisual elementary stream for a content item. E.g. for the MPEG type example, the transport stream may appear to processing circuitry to only include a single elementary stream for all audio (or audiovisual) components for a content item.

However, the audiovisual content item data stream may further comprise a secondary identifier for each individual audio visual data stream that has been combined into the common audio visual data stream. The secondary identifier is unique within the common audio visual data stream, i.e. no two audio visual data streams of a common audio visual data stream will have the secondary identifier. The secondary identifier thus allows the individual audio visual data stream to be identified.

The secondary identifier may in many embodiments be a packet identifier. Thus, in many embodiments, the individual packets may be represented by a common primary packet identifier and by a secondary packet identifier. Each packet may include a field in which the common primary packet identifier is comprised and a second field in which the individual secondary identifier is comprised.

In this way, the packets can be processed by circuitry, such as demultiplexers, routers etc., as if the packets represented a single audio visual data stream. Specifically, by including the common PID in the PMT and the PID field of the data packets for an MPEG type transport stream, the transport stream can be processed as if it comprises only a single audio or audiovisual elementary stream. The functionality can simply process e.g. all audio data packets for the content item in the same way, and as if there were only a single elementary stream. However, at the same time, suitably equipped functionality is able to access the individual audio visual data streams and to process them as separate audio visual data streams. Specifically, such functionality can further evaluate the field comprising the secondary identifier and can accordingly select how to process the data packet. Specifically, it can decide whether to ignore or process the data packets depending on which audio visual data stream are required to provide the desired rendering of the content item.

Thus, when processing the audiovisual content item data stream, a receiver may detect the correct data packets for a given content item based on the primary/common packet identifier. It may particularly, based on the information in the received content item map table, identify all the data packets belonging to the common audio visual data stream, and thus to the individual audio visual data streams forming the common audio visual data stream. Thus, the extraction of audio data is based on the primary identifier.

In embodiments using such a two-part packet identifier approach, the transport stream may comprise additional data that provides information of the individual audio visual data streams, including information of the corresponding secondary identifiers, and typically of characteristics of the audio of the individual audio visual data streams associated with the individual audio visual data streams.

For example, data may be provided which for a given primary identifier lists all the secondary identifiers of the audio visual data streams that share the same primary identifier. The data may further indicate characteristics of the individual audio visual data stream, such as e.g. whether it comprises mandatory audio data, replaceable audio data, additional audio data, alternative audio data etc.

In some embodiments, such information may be provided within the data packets of the common audio visual data stream. For example, at regular intervals, a data packet may be provided which includes all the information relating to the secondary identifier. A receiver may initially detect and extract data from all data packets comprising the primary identifier. When a data packet with information relating to use of the secondary identifier is received, this information can be extracted and used by the receiver to identify the individual audio visual data streams. It may then switch to also consider the secondary identifiers of the data packets comprising the primary packet identifier, and specifically to only extract data from data packets having the desired secondary identifiers.

In other embodiments, the data may be provided outside of the common audio visual data stream, and indeed in many embodiments, the information may be provided in the content item map table.

Specifically, for each common or primary identifier, the content item map table may be generated to include a plurality of secondary packet identifiers, where each secondary packet identifier identifies an individual audiovisual data stream of the audiovisual data streams of the common audio visual data stream.

For example, following the listing of the primary identifier, a number of optional fields may be included in the content item map table where each optional field provides a secondary identifier for an individual audio visual data stream with the common primary identifier. If the primary identifier represents a single audio visual data stream that is not a combination of audio visual data streams, no optional fields may be included. Each optional field may in addition to the secondary packet identifier for an individual audio visual data stream also comprise metadata for the audio visual data stream, such as specifically data defining characteristics of the audio visual data of the audio visual data stream (such as e.g. whether it contains alternative audio data, mandatory audio data, replaceable audio data or additional audio data).

Specifically, the content item map table may be modified or generated to, for each primary identifier include a set of fields with each field representing one individual audio visual data stream of the combined audio visual data stream. Each field may e.g. comprise data representing:

A secondary identifier for the individual audio visual data stream, and

Descriptors for that individual audio visual data stream.

For example, for an MPEG type approach, the PMT may comprise a single PID for all audio for a content item. Following the PID in the PMT there may be a set of fields which for each individual audio visual data stream provides the secondary identifier and metadata characterizing the contents of that individual audio visual data stream.

In some embodiments, the primary/common identifiers and the secondary packet identifiers may be provided in a hierarchical arrangement. For example, a primary packet identifier may be provided in a content item map table at a first level which will be scanned by a receiver looking for elementary streams. The secondary packet identifiers may be provided in optional fields which are linked to the primary packet identifier, such as e.g. by including a list of secondary packet identifiers for each primary packet identifier. In such embodiments, the receiver will accordingly first scan the standard list of primary packet identifiers. When the desired combined elementary stream has been identified, the receiver may proceed to go through the list of secondary packet identifiers which are stored for the identified primary packet identifier. Thus, the secondary packet identifiers are identified in dependence on the corresponding primary packet identifier.

Thus, in some embodiments, a nested structure of the primary and secondary packet identifiers may be used. For example, a PMT may include a list of PIDs in a set of dedicated fields and the list may e.g. include only a single primary PID for a combined elementary stream. However, the PMT may in addition comprise a second list of secondary PIDs for the individual elementary streams of the combined elementary stream. These secondary PIDs are provided in dedicated data fields for secondary PIDs and are linked to the primary PID. Thus, the receiver will only access the secondary PIDs based on the primary PID, and indeed the receiver will differentiate between primary PIDs and secondary PIDs.

However, in other embodiments, a flat structure of primary and secondary packet identifiers may be used. Indeed, a content item map table may comprise a list of identifiers which may contain both primary and secondary identifiers. Indeed, the content item map table may include simple list of all possible audio visual data streams including both combined audio visual data streams and individual audio visual data stream. Furthermore, a given individual audio visual data stream may be represented by the secondary packet identifier for the individual audio visual data stream and may also be represented by the primary packet identifier (i.e. the selection of either of these packet identifiers will result in the selection of the audio visual data stream). Indeed, for each individual audio visual data stream, the content item map table may include an entry for the primary packet identifier of any combined audio visual data stream that the individual audio visual data stream belongs to, as well as the secondary packet identifier for the individual stream. Thus, in this example, a list may e.g. comprise an entry with a packet identifier for all audio visual data streams, including both combined and individual audio visual data streams.

Accordingly, in some embodiments, the secondary packet identifiers may be encapsulated in data linked to a primary packet identifier whereas in other embodiments the secondary packet identifier may be provided in parallel to the primary packet identifiers. A primary packet identifier may accordingly be any identifier providing a packet identifier for a combined audio visual data stream comprising a plurality of audio visual data streams. A secondary packet identifier may be any packet identifier for an individual audio visual data stream and need not be encapsulated, embedded or dependent on a primary packet identifier.

For example, rather than embed information of the secondary packet identifiers in data for a single primary packet identifier, the content item map table may be generated to include all possible packet identifiers in a loop/sequence. In such embodiments, the receiver can simply select the packet identifier that corresponds to the specific data that is required and can choose to e.g. select a single combined audio visual data stream or an individual audio visual data stream simply by selecting the appropriate packet identifier from the list.

In such embodiments, the receiver 1401 may specifically be arranged to select the desired audio by selecting the required packet identifiers rather than merely transmitting all audio information in a single combined stream.

The approach may combine properties and characteristics of having a single audio visual data stream with that of having a plurality of audio visual data streams in a transport stream.

This may provide a significant advantage as a lot of equipment in the field are not capable of reliably handling multiple audio visual data streams.

FIG. 14 illustrates an example of a receiving apparatus which comprises a receiver 1401 coupled to an audio decoder 1403. In the example, the receiver 1401 receives the audiovisual content item data stream and is capable of processing this to e.g. extract various audio visual data streams. Thus, the receiver 1401 may receive a transport stream and may be arranged to process this to e.g. generate individual audio and video elementary data streams. The receiver 1401 may specifically correspond directly to the receiver 401 of FIG. 4.

The audio decoder 1403 is arranged to receive one or more data streams comprising audio data and to generate an output audio signal from this audio data. The audio decoder 1403 may specifically comprise functionality for receiving the audio data from the audio visual data streams of the audiovisual content item data stream. As such, the audio decoder 1403 may specifically comprise functionality of extracting mandatory audio data from an elementary stream, for retrieving alternative audio data from the same or from another elementary stream, for replacing received replaceable audio data with the alternative data, and for generating the audio signal from the resulting audio data.

Specifically, the audio decoder 1403 may comprise the remaining functional blocks of FIG. 4, and may specifically comprise the data extractors 403, 405, 407, the decoding units 409, 411, 413 and the replacer/combiner 415.

In the example of FIG. 14, the audio decoder 1403 may be provided with different audio visual data streams/elementary data streams where each stream is an audio stream comprising different audio data. However, in many embodiments, the receiver 1401 may be arranged to generate a single data stream which comprises all the audio data and to feed this data stream to the audio decoder 1403. The receiver 1401 may for example combine the audio elementary streams into a single combined audio stream comprising the different elementary streams. In some scenarios, the single combined audio stream may still comprise the individual audio visual data streams, e.g. the individual audio visual data streams may be encapsulated into a single data stream. In other scenarios, the receiver 1401 may e.g. extract the relevant audio data and combine this into an audio data stream without including all aspects of the input audio visual data streams. For example, the receiver 1401 may generate a new data stream comprising different control, syntax and/or structure data for the data stream. In some cases, the audio data may be combined into a new audio visual data stream, i.e. a new elementary stream. This combined audio visual data stream/elementary stream may comprise the original elementary stream of the received transport stream or may include some or all of the audio data in an independent elementary stream. For brevity, the following description will mainly refer to transport streams and elementary streams rather than to audiovisual content item data streams and audio visual data streams. Furthermore, it will refer to a scenario where the receiver 1401 generates a single elementary stream for the audio decoder 1403.

Thus, the audio decoder 1403 will receive one audio elementary streams and will generate the output audio stream.

In many practical implementations, a receiver and decoder are relatively independent and separate functional blocks rather than closely integrated functions. Indeed, in many scenarios the two entities may be designed and developed independently and separately. For example, for many content rendering devices, the audio decoders are generic decoders that are reused for many different devices. For example, many manufacturers of content rendering devices may buy-in generic audio decoder functions rather than develop them in-house.

Accordingly, the interface between the receiver 1401 and audio decoder 1403 is of critical importance in many scenarios, and it is desirable to utilize a simple and standardized, or at least common approach, rather than rely on e.g. dedicated and proprietary interface and control.

Traditionally, an audio decoder has been considered in the framework of a relatively simple device which is fed a bitstream that is decoded according to the decoding standard implemented by the audio decoder and without any further modifications or interaction by external circuitry. Such an approach may for example be used in the embodiment of FIG. 4 where each of the decoding units 409-413 are fed a simple elementary stream from which it generates an audio signal that can subsequently be combined by the combiner 415 in accordance with the specific audio preferences for the specific rendering, and specifically the output signal may be generated based on the replaceable audio data or alternative data as required e.g. by the specific user.

In some embodiments, the apparatus may use a more complex audio decoder 1403 which may specifically receive one or more audio elementary streams and from this generate the output audio by e.g. manipulating the data before the decoding of the audio signal. For example, the audio decoder 1403 may in such embodiments select the appropriate data to be used before the actual decoding is performed. Thus, audio data which is not used may not be decoded and indeed may not even be extracted from the data stream(s) provided to the audio decoder 1403. For example, replaceable audio data which is replaced by alternative data may not be decoded or even extracted. Similarly, alternative audio data that is not used or alternative audio data which is not used to replace replaceable audio data may not be decoded or extracted.

Thus, in some embodiments, the replacement of replaceable audio data by alternative audio data may not be performed by adapting a combination of decoded audio signals but may instead be performed by selecting the alternative audio data for decoding rather than selecting the replaceable audio data. The output signal may in this case e.g. be generated by decoding only the mandatory audio data and the alternative audio data, and adding the resulting audio signals together.

Such an approach may in many scenarios provide for a more efficient operation. However, it requires the decoder to be able to adapt to the specific requirements and preferences of the individual scenario. Furthermore, it requires the decoder to be able to process a plurality of different audio components and to adapt to these in a flexible manner. Specifically, rather than the audio decoder merely rendering all received audio data, it needs to be able to flexibly combine different audio objects and specifically to replace some audio objects by other objects.

However, in order to achieve this, it is necessary for the receiver to instruct the audio decoder 1403 of how to process the audio data provided to it. One possibility is to implement a proprietary interface wherein the receiver 1401 is arranged to generate various control signals that control the audio decoder 1403 to perform the required operations. However, such an approach tends to result in complex embodiments and to require that a dedicated and proprietary decoder is used.

In the system of FIG. 14, the audio decoder 1403 is arranged to be controlled by the receiver 1401 generating an audio visual data stream that includes the audio data, and which further includes an audio data processing descriptor that indicates how different audio data is to be processed by the audio decoder 1403. In the example, the receiver 1401 specifically generates a single audio visual data stream which comprises all audio data that may potentially be used by the audio decoder 1403, and possibly all audio data comprised in the input transport stream for the given content item. In addition, the same audio visual data stream comprises decoding/processing control data which allows the audio decoder 1403 to adapt the decoding/processing and specifically the combination of audio objects to the specific preferences for this rendering. Thus, in the system of FIG. 14, the receiver 1401 adds a control descriptor in the form of an audio data processing descriptor to the audio elementary stream fed to the audiovisual data stream and the audio decoder 1403 interprets this audio data processing descriptor to control its decoding task.

In more detail, in the example of FIG. 14, the receiver 1401 receives a transport stream comprising a plurality of elementary streams including a number of audio elementary streams for a given content item. The receiver 1401 extracts one or more of the audio elementary streams and generates one or more output elementary streams from this. Specifically, based on the first audio visual data stream, which specifically may be a first elementary stream comprising mandatory audio data and replaceable audio data for a first content item, the receiver 1401 may generate a second audio visual data stream which specifically may be a second elementary stream comprising the mandatory audio data and the replaceable audio data from the first audio visual data stream. In addition, the second audio visual data stream/elementary stream may comprise audio data from another input elementary stream, such as for example from an elementary stream comprising alternative audio data.

In addition, the receiver 1401 generates an audio data processing descriptor which is indicative of how the audio decoder 1403 should generate the output audio signal from the audio data of the second elementary stream. The audio data processing descriptor is included in the second elementary stream. For example, the second elementary stream may be generated to comprise one or more fields comprising data describing how the individual audio components should be processed, and specifically how (whether) they should be decoded and combined with other audio components.

The receiver 1401 then feeds the second elementary stream to the audio decoder 1403. The audio decoder 1403 proceeds to extract the audio data processing descriptor from the second audiovisual data stream and to generate an audio signal in response to the audio data processing descriptor.

The audio data processing descriptor may define which audio components should be combined together to generate the output signal and accordingly the audio decoder 1403 may specifically retrieve (only) the indicated audio components, decode these, and finally add them together.

In some embodiments, the receiver 1401 may include a plurality of audio data processing descriptors with each of the audio data processing descriptors providing processing indications for a subset of the audio components of the second elementary stream. In some embodiments, one audio data processing descriptor may be provided for each audio component with the audio data processing descriptor specifically describing whether the corresponding audio component is mandatory audio data, replaceable audio data, or alternative audio data. The audio data processing descriptors may furthermore describe whether in fact an alternative audio component should replace a given replaceable audio component or not.

As a specific example, an audio data processing descriptor may be provided for a given audio component to indicate whether this should be treated as alternative audio data or as additional data. Alternative audio data is data that will replace some replaceable audio data whereas additional data is data that is added to the replaceable audio data.

For example, the input stream to the receiver 1401 may comprise an elementary stream comprising first audio data for a given first audio component. In some rendering situations, it may be desired that the first audio component replaces a second audio component of the input transport stream. Thus, in this case, the first audio data represents alternative audio data for an alternative audio component that is rendered instead of the second audio component, which is a replaceable audio component. However, in other scenarios it may be desired that the first audio component is rendered together with the second audio component, i.e. that both audio components are rendered together.

In the first case, an audio data processing descriptor can be included in the second elementary stream by the receiver 1401 to indicate that the first audio data is indeed alternative audio data that should replace the second audio data. However, in the latter case, an audio data processing descriptor can be included by the receiver 1401 to indicate that the first audio data is instead additional audio data that should be added to the second audio data, i.e. that both audio components should be extracted and rendered. Thus, in this case an audio data processing descriptor is inserted for the first audio data indicating whether this is designated alternative audio data or additional audio data.

The audio decoder 1403 will process the data in accordance with the received audio data processing descriptors. In the specific example, if the audio data processing descriptor is indicative of the first audio data being designated as alternative audio data, the audio decoder 1403 proceeds to extract the first audio data and treat it as alternative audio data. Furthermore, it replaces the replaceable audio data in the form of the second audio data by this extracted first audio data. The replacement may specifically be achieved by only decoding the first audio data whereas the second audio data is not extracted and not decoded. Accordingly, the first audio component is generated and included in the output audio signal.

However, if the audio data processing descriptor is indicative of the first audio data being designated as additional audio data, the audio decoder 1403 proceeds to extract both the first audio data and the second audio data. Furthermore, both the first audio data and the second audio data is decoded to generate the first audio component and the second audio component. Both of these are then combined in the output signal.

In such embodiments, the receiver 1401 may accordingly control the operation of the audio decoder 1403, and specifically may control which audio data contributes to the output signal and which are ignored. The approach allows for a low complexity control and may enable an audio decoder 1403 to only require an input data stream to generate the desired audio output.

The approach may further allow e.g. all audio data of the transport stream (for a given content item) to be included in the second audio visual data stream provided to the audio decoder 1403 while at the same time allowing this data to be flexibly used, and specifically while still allowing an output signal to be generated which only includes a subset of the audio components. The audio components may be flexibly selected by the receiver 1401 via data included in the second audio visual data stream itself.

The receiver 1401 may for example generate an audio data processing descriptor which is indicative of whether given audio data is audio data from the group of:
 mandatory audio data;
 replaceable audio data;
 alternative audio data; and
 additional audio data.

In some embodiments, a subset or superset of this group may be used.

The audio data processing descriptor for a given content item may for example be generated in response to a rendering preference for the specific device, or e.g. in response to a user input.

As an example, a received transport stream may comprise a mandatory background audio component, an English language audio component, a German background audio component, and a secondary background component. The user may select which audio components are desired and the audio data processing descriptors may be generated to reflect the selected audio components such that these are extracted and decoded by the audio decoder 1403.

In some embodiments, the audio data processing descriptors may be generated by the receiver 1401 without relying on any predetermined audio data processing descriptors, and specifically without relying on any audio data processing descriptor from the received transport stream.

However, in other embodiments, the audio data processing descriptors of the second elementary stream are generated from audio data processing descriptors being part of the received audiovisual content item data stream, i.e. as part of the received transport stream.

Specifically, the receiver 1401 may be arranged to generate a first audio data processing descriptor from a second audio data processing descriptor received in the transport stream. Thus, for a given audio elementary stream of the input transport stream, the transport stream may include one or more audio data processing descriptors which indicate how the audio data of this audio elementary stream should be decoded by the audio decoder 1403.

For example, a given audio elementary stream may comprise alternative audio data which is intended for replacing replaceable audio data. For example, the elementary stream may comprise German dialogue which should replace the default dialogue audio component, such as e.g. an English dialogue audio component. The input transport stream may accordingly include an audio data processing descriptor which defines that this audio data should be treated as replaceable audio data, and that it should replace other dialogue audio data. The transport stream may include other dialogue audio elementary streams and for each of these, the transport stream may also include an audio data processing descriptor.

Thus, in this example the apparatus generating the transport stream, such as e.g. the apparatus of FIG. 3, may further be arranged to generate audio data processing descriptors that indicate how the corresponding audio data should be, or may be, processed. For example, an audio data processing descriptor may be included for each dialogue audio component indicating that this track can be selected and that if so it should replace all other dialogue audio components.

The audio data processing descriptors are included in the transport stream, for example in the program map for the content item, or possibly in the individual data packets for the individual elementary stream.

In particular, in many embodiments, the audio data processing descriptor may at the transport stream generating side be included in the program map table for the content item. As a specific example, for each audio elementary stream, the program map table may include not only the packet identifier for the elementary stream but also one or more audio data processing descriptors indicating how the audio data should be decoded. This may allow the source to control and describe how the content can, may, and/or should be decoded and rendered.

The receiver 1401 may when receiving such a transport stream generate the second elementary stream and feed it to the audio decoder 1403 with the second elementary stream comprising audio data processing descriptors that are generated from those of the input transport stream and which describe how the specific audio data should be decoded and rendered in the specific situation.

The audio data processing descriptors of the second elementary stream are generated from the received audio data processing descriptors. This process may in some embodiments be a complex process that evaluates the received audio data processing descriptors and therefrom generates new audio data processing descriptors that reflect a specific processing.

However, in many embodiments, the receiver 1401 may be arranged to simply copy the appropriate audio data processing descriptors from the transport stream to the second elementary stream.

Specifically, the audio data processing descriptors of the input stream that describe a processing or specifically which audio data which is desired for the current rendering may be copied from the input transport stream to the second elementary stream.

For example, if the audio data for a given audio component or audio elementary stream is desired to be rendered, the receiver 1401 may simply copy the audio data processing descriptor for this audio component or audio elementary stream to the second elementary stream. E.g. if it is desired that the German dialogue audio track is rendered, the receiver 1401 may copy the audio data processing descriptor for the German dialogue elementary stream (together with the audio data) into the second elementary stream. Accordingly, the second elementary stream will contain an audio data processing descriptor that causes the audio decoder 1403 to replace the replaceable audio data of the English dialogue with that of the German dialogue.

If it is not required that the audio data is rendered, e.g. if the user prefers English dialogue, the receiver 1401 may not copy the audio data processing descriptor for the German dialogue elementary stream into the second elementary stream. In such embodiments, the audio decoder 1403 may for example be arranged to ignore or discard audio data for which no audio data processing descriptor is included in the elementary stream input to the audio decoder 1403.

In some embodiments, the source may be arranged to generate a transport stream comprising a plurality of possible audio data processing descriptors for a given audio elementary stream. The plurality of possible audio data processing descriptors may for example describe the different possible ways that the audio data of the elementary stream can be used. For example, if the audio component can be rendered both as well as, and instead of, another audio component, the transport stream may comprise an audio data processing descriptor indicating that the data is alternative audio data and one audio data processing descriptor indicating that the data is additional audio data. Thus, each of the possible audio data processing descriptors may describe an allowable processing of the corresponding audio data.

In such embodiments, the receiver 1401 may e.g. extract the plurality of possible audio data processing descriptors for the audio data. Based on the desired rendering (e.g. based on the language selections of a user), the receiver 1401 may proceed to select one of the audio data processing descriptors that correspond to the desired rendering. This audio data processing descriptor may then be copied to the second elementary stream whereas the other audio data processing descriptors may be ignored.

In the described example, the audio data processing descriptor may be considered to correspond to the use of a token, found in the input transport stream, to be injected in the data stream for the audio decoder 1403, and used as command for this. The audio data processing descriptor may comprise an indication of the required processing of the audio data by the audio decoder 1403.

This approach may result in a more generic and open way to implement an interface to an audio decoder 1403. It may also allow low complexity processing. As a specific significant advantage, the receiver 1401 simply needs to select which rendering is desired and then copy the corresponding audio data processing descriptor from the input transport stream to the second elementary stream. It does not need to consider, or indeed have any knowledge of, how the actual processing by the audio decoder 1403 is performed. Rather, the audio decoder 1403 interprets and executes the processing defined by the audio data processing descriptor.

This is very advantageous since the alternative of creating a proprietary interface to the audio decoder 1403 requires the receiver 1401 to understand, not only the choice, but also the concept of "replacement", namely, that the objects in this stream must replace objects in the main stream. A receiver 1401 that only forwards copies of audio data processing descriptors only has to understand that a selection is made. This implies that the action described by the audio data processing descriptors can be arbitrarily complex and constantly change and improve in time, because all that the receiver 1401 has to do is to copy the relevant audio data processing descriptors. The receiver 1401 does not need to understand which proprietary commands it will need to realize the complex action coupled with the inclusion of a given stream in the total stream.

Figure 15:
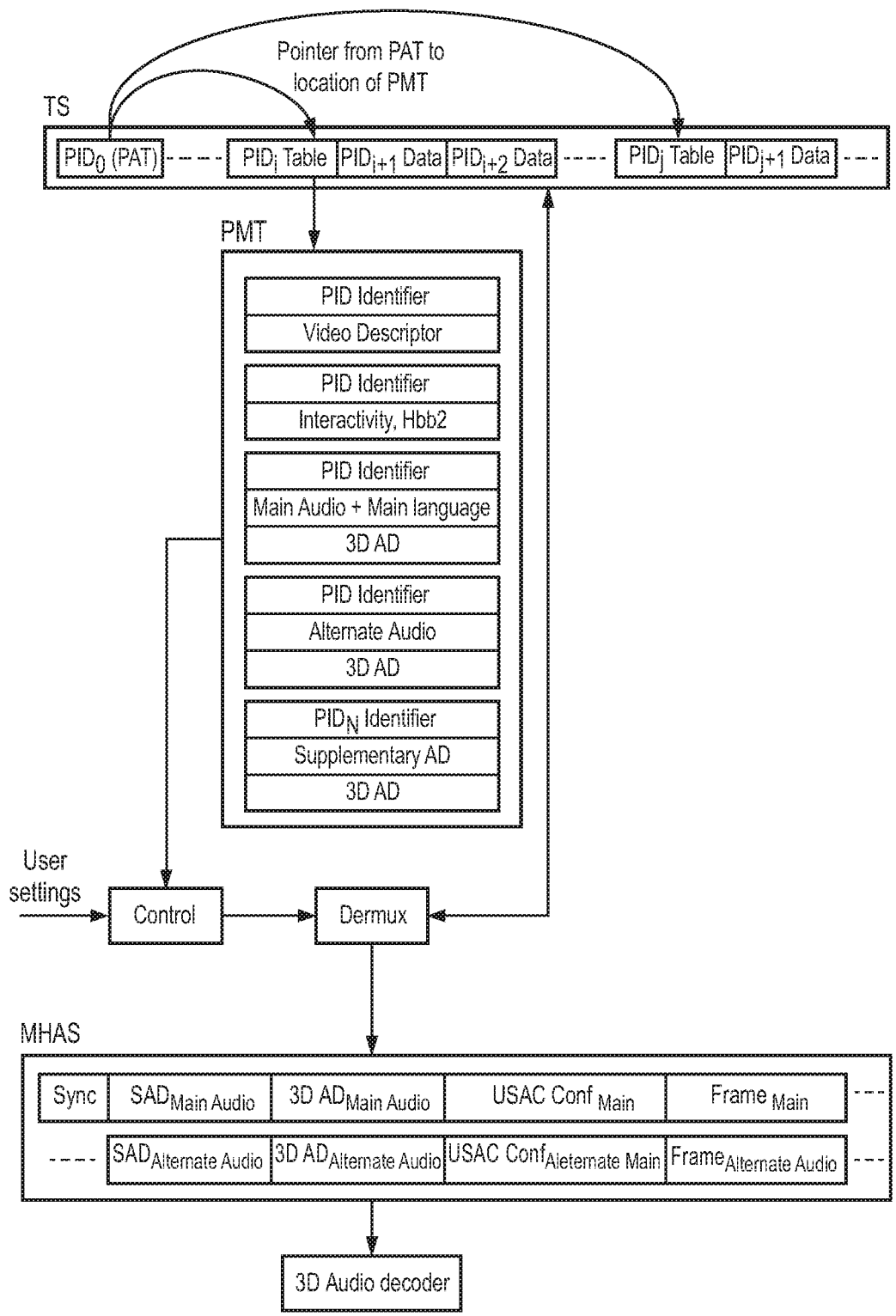
FIG. 15 illustrates an example of an operation using audio data processing for a (modified) MPEG transport stream.
Figure 16:
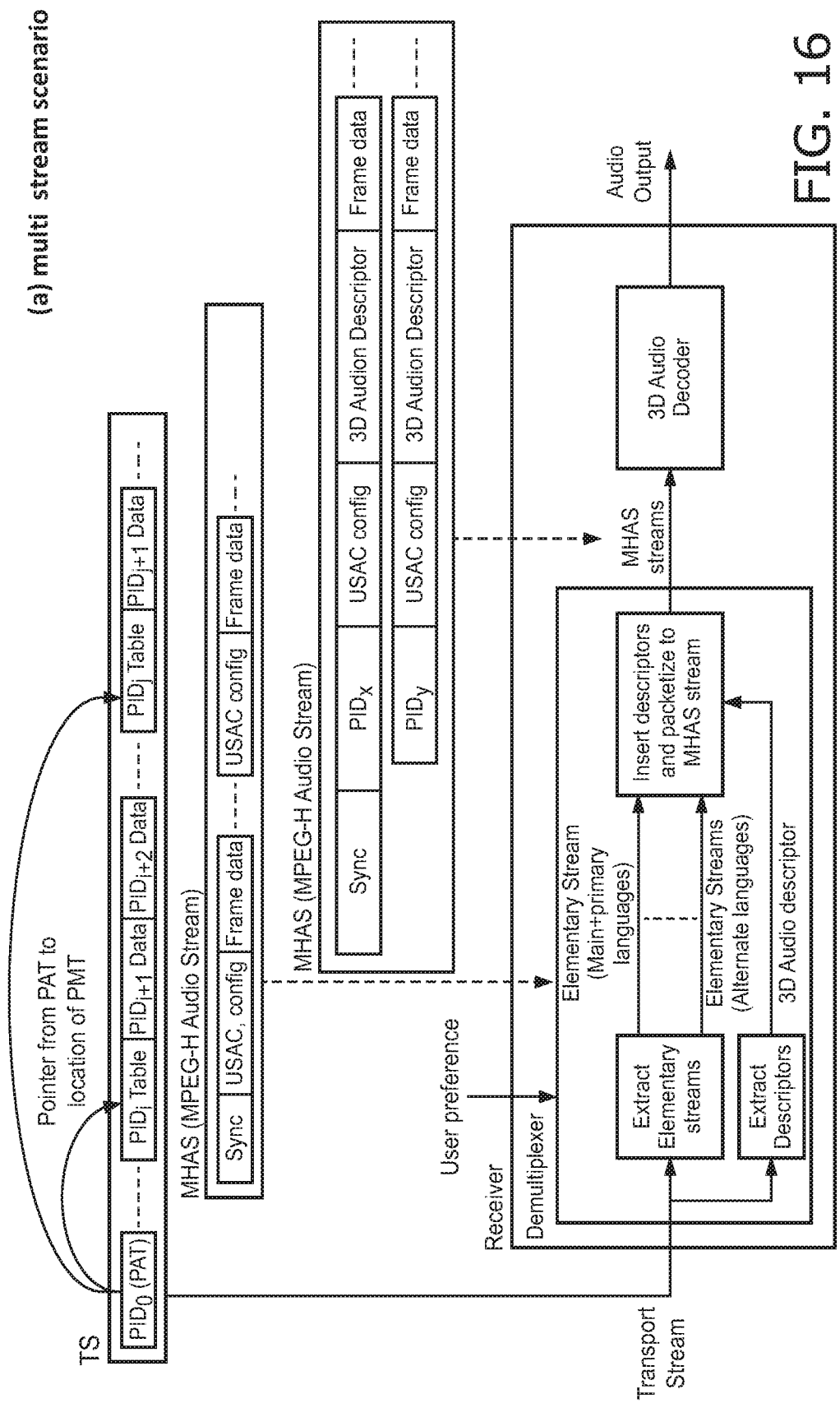
FIG. 16 illustrates another example of an operation using audio processing for a (modified) MPEG transport stream.
Figure 16:
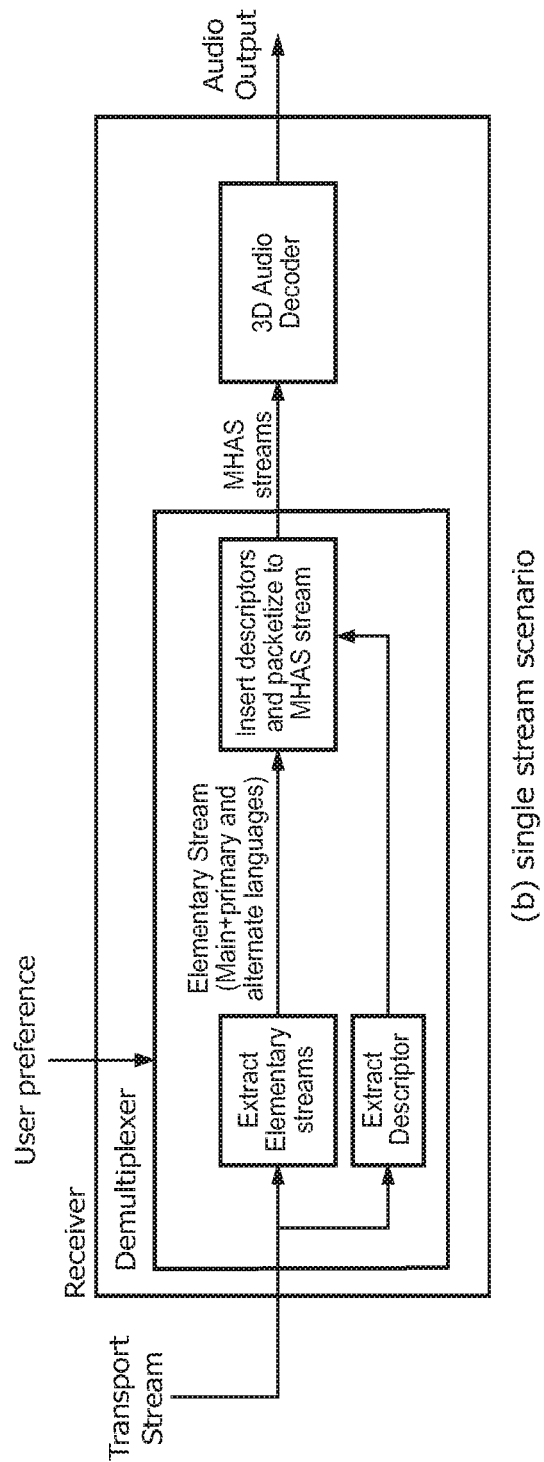

Specific examples of an operation using audio data processing descriptors are provided in FIGS. 15 and 16 for a (modified) MPEG transport stream. In the examples, the audio data processing descriptors are referenced to as "3D AD" and "3D Audio Descriptor". In the examples, the second audio visual data stream/elementary stream is generated as an MPEG-H Audio Stream (MHAS).

The previous description provides a number of examples of approaches concerned with the efficient distribution of audio in audio visual content item data streams, and specifically with the distribution of audio content in such data streams.

When deciding on an approach for distribution of audio visual content, the designer is faced with many different and often conflicting technical challenges. Specifically, it is desired that the data rate is as low as possible while maintaining as high a quality as possible. Another trade-off is between the desire to provide a data representation that is very simple to process and render by a receiver yet still provides a high degree of flexibility for the receiver to customize the rendering of the data. In order to support such flexibility, an increasingly complex data stream structure and organization may be required but this also tends to require more complex processing at the receiver side.

Thus, the question of how to divide, structure and organize data in audio visual data streams is a critical and difficult technical problem that requires a number of technical trade-offs.

The previously described approaches address this problem and seek to provide an improved trade-off between different characteristics, requirements and preferences for various applications.

The approaches utilize a more flexible approach than traditional MPEG data streams wherein all audio for an audio representation is typically provided in a single elementary stream. Indeed, a conventional MPEG data stream is organized as a transport stream that comprises a plurality of elementary streams where each elementary data stream comprises a video or audio component. The data in MPEG transport streams is thus structured in elementary streams and two possible audio elementary streams are defined. One is an elementary data stream which provides a full audio representation for a content item, i.e. an audio component corresponding to the entire sound stage is provided in a single elementary stream. The other option is for an audio elementary stream to include audio data for an additional sound component that can be combined with/added to a complete (full representation) audio component.

The approach of MPEG has the significant advantage that it has low complexity and that the content can be rendered based on low complexity processing. Indeed, identifying and extracting the required audio data for a given content item typically only requires one elementary data stream to be identified in and extracted from the transport stream, and typically only requires one audio component to be decoded. MPEG provides some flexibility by allowing the audio to be complemented by additional audio components. These additional audio components are additional audio components that may be ignored or may be combined with/added to a complete audio component. However, no other options are possible, i.e. the audio components are additional components which cannot replace audio data for the complete representation.

Thus, for a conventional MPEG transport stream, audio data is either designated as complete audio data which is provided individually and separately in a single elementary data stream, or is designated additional audio data which is also provided by itself in a separate elementary stream. Accordingly, each elementary stream provides one type of audio data that can either be rendered directly or added to a complete audio component.

The MPEG approach provides a data stream with a compact data representation and low data overhead that allows low complexity processing by a receiver. Indeed, the receiver need only consider a PID (Packet IDentifier) of data packets to find and extract only the audio data that is required, i.e. there is a direct correspondence between the type of audio data and the identification of the elementary stream. However, a downside of the approach is that the flexibility of audio rendering is low, and essentially is limited to the possibility of optionally adding additional audio to an otherwise complete audio representation.

In recent years, it has been proposed to introduce audio objects. Instead of providing an audio component that corresponds to the entire sound stage/scene, the approach is based on instead providing a large number of individual audio objects that each correspond to one sound source in the audio scene. The final renderer may accordingly create a given sound scene by individually decoding each audio object, positioning the object in the sound scene, generating the appropriate spatial audio signals, combining the audio objects, and finally rendering the combined signals.

Such an approach provides a high degree of flexibility for the rendered audio and provides the receiver with a high degree of freedom. However, it requires very complex processing at the receiver. Indeed, the processing required to render audio data is complex, and in addition, the complexity and processing required to identify and extract the required and desired audio data, as well as determining how the audio data can be used in rendering, is very complex. The approach also results in a large data overhead in order to provide the necessary information required to identify the distribution of data in the data stream.

The previously described approaches are directed to providing a different, and for many scenarios an improved trade-off between complexity, data overhead, and flexibility when distributing content items than those provided by a conventional MPEG transport stream or an audio object transport stream.

The approaches are based on a novel data stream comprising different types of audio data than in the conventional transport stream and on having a different organization of this data in the data stream.

Similarly to traditional MPEG approaches, the approaches are based on an audio visual content item data stream (transport stream) that comprises a plurality of individual audio visual data streams comprising audio visual components (referred to as elementary streams) for an audio visual content item.

However, the approaches are based on elementary data streams that may each provide audio data sufficient for an audio representation for the content but which comprise different types of audio data. Thus, the transport stream is arranged to include an elementary stream which comprises different types of audio data. Indeed, some of the audio data of this elementary stream is designated to be mandatory audio data for the audio representation. Mandatory audio data must be rendered when the audio representation is presented. Other data of the elementary data stream is designated as replaceable audio data. This replaceable audio data is audio data for the audio representation but is audio data that the receiver is allowed to substitute by other (alternative) data.

Thus, in the approaches, a single elementary stream is provided with different types of data for a given audio representation, namely with some data which is designated as mandatory audio data that must be rendered when the audio representation is presented, and with other data which is designated as replaceable audio data that can be replaced/ or substituted by other data.

Accordingly, in the approaches, a transport stream provides an audio representation wherein different types of audio data for the audio representation are provided within a single elementary data stream. Furthermore, the data is specifically designated as data that must be presented/ rendered (when the corresponding audio representation is presented/rendered) or data that can be substituted/replaced by other data. The replaceable audio data is data which is designated to be substitutable by other data but which cannot be deleted without being replaced.

This specific approach provides for a data stream structure that is substantially more efficient and provides a better trade-off between data rate, complexity, and flexibility in many scenarios and applications. It can furthermore provide these advantages while providing an increased backwards compatibility to prior art approaches such as MPEG transport streams.

Specifically, the approaches may provide a bit stream that does not require much overhead yet it provides a flexible approach. A low complexity receiver can identify and extract data based on how the data is structured into elementary streams. However, it can further increase flexibility by different audio data of one elementary stream being designated as having different characteristics with respect to the audio representation.

The approaches may e.g. allow for a low complexity legacy receiver to still be able to render the audio representation of the novel data stream based purely on identification of the elementary stream. E.g. in many embodiments, a legacy MPEG decoder can simply extract the first elementary stream and treat this as a standard MPEG elementary stream. This can result in a nominal audio presentation being generated. However, in addition to such backwards compatibility, a non-legacy receiver may process the received data stream and substitute the replaceable audio data by alternative data thereby generating an alternative audio presentation. This can still be achieved with low complexity and does not require the complex processing and overhead associated with e.g. audio objects.

The approaches provide an advantageous solution to the technical problem of how to best distribute audio content for audio visual content items, and specifically provide a (transport) data stream structure and data content that provides improved trade-off between data rate, complexity and flexibility, and which may also provide improved backwards compatibility.

The mandatory audio data is data which is designated (and in many embodiments indicated) to be data that must be included in a rendering of the audio representation/audio scene. Thus, the mandatory audio data for an audio presentation is data which is included in the elementary data stream and which must be rendered if the audio representation/audio scene of the elementary data stream is selected. Thus, the mandatory audio data is data which is designated to be compulsory, required, obligatory etc. for the rendering of the audio representation/audio scene associated with the elementary data stream. In many embodiments, the mandatory audio data and replaceable audio data may be comprised in an elementary data stream associated with only one audio representation/audio scene.

The mandatory audio data may be designated/indicated to be mandatory audio data e.g. via the position in the elementary stream and/or by control data describing the data to be mandatory. Thus, in some embodiments, the transport data stream, and possibly specifically the elementary data stream, may include data indicating which audio data of the elementary data stream is mandatory audio data.

The replaceable is data which is designated (and in many embodiments indicated) to be data that may be included in a rendering of the audio representation/audio scene or which may be replaced by other audio data in the rendering of the audio representation/audio scene. Thus, the replaceable audio data for an audio presentation is data which is included in the elementary data stream and which must be rendered if the audio representation/audio scene of the elementary data stream is selected unless it is replaced by other audio data. The replaceable audio data is data which can either be rendered or which can be substituted/replaced/swapped/exchanged by alternative data when rendering/presenting the audio representation/audio scene associated with the elementary data stream.

In the described approaches, the distribution of content is accordingly based on a (transport) stream that includes a plurality of sub-(elementary) data streams wherein an audio representation can be described by a single elementary data stream comprising both data designated as mandatory audio data and data designated as replaceable audio data, i.e. a single elementary data stream includes both audio data that a receiver must present when presenting the audio representation, as well as audio data that the receiver may substitute by other data.

Thus, the receiver receives audio data that it knows must be rendered as well as data that it knows it can substitute by other data. Furthermore, it receives this data in a single elementary stream thereby making a presentation of the audio representation possible simply by extracting the audio data from one elementary data stream and rendering this (thus providing backwards compatibility).

Thus, the transport stream comprises data which is associated with specific restrictions on how they must be used by a receiver/renderer. This specific structure of different types of data which is designated to be used differently, and which is associated with different restrictions for their use, may provide an efficient transport stream to be generated with improved trade-offs, and specifically which still allows low complexity processing and backwards compatibility at the same time as increased flexibility.

Indeed, the designation of audio data for one audio representation within one elementary data stream as mandatory or replaceable audio data provides substantial benefits. The described structure, content, and organization of the audio visual content item data stream provide a transport stream which can be processed with low complexity, may be backwards compatible, yet which can provide increased flexibility.

The approach is accordingly not focused on the derivation, determination, or selection of any specific mixing or audio policy but is instead concerned with the technical solution that can support the effective distribution of audio data such that such policies can be complied with. The approach allows the use of data streams that allow flexible (but not fully free) policies to be distributed while maintaining a low data overhead and reducing complexity. The approaches do not focus on how to select a mixing strategy but on how to technically support distribution of audio data. The approach allow some aspects of the rendering policy to be determined by the source (e.g. the mandatory audio data) whereas other aspects can be adapted at the receiving/rendering end (e.g. the receiver can select between different alternative audio components).

It is also noted that it is not the actual processing in the receiver that defines the data. Rather, it is the data in the data stream is designated as mandatory or replaceable audio data for an audio representation. The data is accordingly defined by the intended use, i.e. the mandatory audio data is data that should be presented if the audio representation is selected whereas the replaceable audio data may be substituted by other alternative data (but may not merely be deleted).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method of generating an audiovisual content item data stream, wherein the audiovisual content item data stream comprises a plurality of individual audiovisual data streams, wherein the plurality of individual audiovisual data streams includes audiovisual components for an audiovisual content item, wherein each audiovisual data stream includes encoded data representing at least one audiovisual component and synchronization data, wherein the method comprises:
generating a first audiovisual data stream,
wherein the first audiovisual data stream includes first audio data for an audio representation for the audiovisual content item,
wherein the first audio data includes mandatory audio data for the audio representation and includes replaceable audio data for the audio representation,
wherein the replaceable audio data is replaceable by alternative audio data;
generating second audio data;
including the second audio data in one of the plurality of individual audiovisual data streams;
generating a first audio processing descriptor, wherein the first audio processing descriptor indicates that the second audio data is the alternative audio data which can replace the replaceable audio data and be added to the mandatory audio data at a receiver, depending on a desired rendering at the receiver;
generating a second audio processing descriptor, wherein the second audio processing descriptor indicates that the second audio data is additional audio data which can be added to the mandatory audio data and the replaceable audio data at a receiver, depending on the desired rendering at the receiver; and
including the first audiovisual data stream, the second audio data, the first audio processing descriptor and the second audio data processing descriptor in the audiovisual content item data stream.

2. The method of claim 1, further comprising including the second audio data in the first audiovisual data stream.

3. The method of claim, further comprising including the second audio data in a different audiovisual data stream of the plurality of individual audiovisual data streams than the first audiovisual data stream.

4. The method of claim 1, wherein the replaceable audio data represents a speech audio component in a first language and wherein the second audio data represents a speech audio component in a second language.

5. The method of claim 1, wherein the mandatory audio data represents a background audio component and wherein the replaceable audio data represents a speech audio component.

6. The method of claim 1, wherein the replaceable audio data and the second audio data represent the same audio content encoded using different encoding characteristics.

7. The method of claim 1, further comprising including rendering control data in the audiovisual content item data stream, wherein the rendering control data provides a different rendering parameter for a rendering using the replaceable audio data than for a rendering using the second audio data.

8. The method of claim 1, further comprising including an indication in the audiovisual content item data stream of the first audiovisual data stream comprising replaceable audio data.

9. The method of claim 1, further comprising including extraction data for the replaceable audio data in the audiovisual content item data stream.

10. The method of claim 1, further comprising:
generating a content item map table, wherein the content item map table for a content item comprises a list of audiovisual data stream packet identifiers for data packets for audiovisual data streams linked to the content item; and
including the content item map table in the audiovisual content item data stream;
wherein generating the content item map table comprises generating the content item map table to include a common data stream packet identifier for the content item for a set of at least two of the plurality of individual audiovisual data streams.

11. The method of claim 10, wherein generating the content item map table comprises including only one audiovisual data stream packet identifier for the content item in the content item map table.

12. The method of claim 10, wherein generating the content item map table comprises for the common data stream packet identifier including a plurality of secondary packet identifiers, wherein each secondary packet identifier identifies an individual audiovisual data stream of the set of at least two of the plurality of individual audiovisual data streams.

13. The method of claim 10, further comprising generating the content item map table to include the first audio data processing descriptor and the second audio data processing descriptor.

14. An apparatus for generating an audiovisual content item data stream, comprising:
a generator adapted to:
generate a first audiovisual data stream,
wherein the first audiovisual data stream includes first audio data for an audio representation for an audiovisual content item,
wherein the audiovisual content item data stream comprises a plurality of individual audiovisual data streams,
wherein the plurality of individual audiovisual data streams includes audiovisual components for an audiovisual content item,
wherein each audiovisual data stream includes encoded data representing at least one audiovisual component and synchronization data,
wherein the first audio data includes mandatory audio data for the audio representation and includes replaceable audio data for the audio representation,
wherein the replaceable audio data is replaceable by alternative audio data,
generate second audio data and including the second audio data in one of the plurality of individual audiovisual data streams;
generate a first audio processing descriptor, wherein the first audio processing descriptor indicates that the second audio data is the alternative audio data which can replace the replaceable audio data and be added to the mandatory audio data at a receiver, depending on a desired rendering at the receiver;

generate a second audio processing descriptor, wherein the second audio processing descriptor indicates that the second audio data is additional audio data which can be added to the mandatory audio data and the replaceable audio data at a receiver, depending on the desired rendering at the receiver; and a combiner adapted to include the first audiovisual data stream, the second audio data, the first audio processing descriptor and the second audio data processing descriptor in the audiovisual content item data stream.

15. The apparatus of claim 14, wherein the generator is further arranged to include the second audio data in the first audiovisual data stream.

16. The apparatus of claim 14, wherein the generator is further arranged to include the second audio data in a different audiovisual data stream of the plurality of individual audiovisual data streams than the first audiovisual data stream.

17. The apparatus of claim 16, wherein the replaceable audio data represents a speech audio component in a first language and the second audio data represents a speech audio component in a second language.

18. The apparatus of claim 14, wherein the replaceable audio data represents a speech audio component in a first language and wherein the second audio data represents a speech audio component in a second language.

19. The apparatus of claim 14, wherein the mandatory audio data represents a background audio component and wherein the replaceable audio data represents a speech audio component.

20. The apparatus of claim 14, wherein the generator is further adapted to:

generate a content item map table to include the first audio data processing descriptor and the second audio data processing descriptor; and include the content item map table in the audiovisual content item data stream.

* * * * *